United States Patent [19]
Masuda et al.

[11] Patent Number: 5,434,735
[45] Date of Patent: Jul. 18, 1995

[54] RECORDING/PLAYBACK APPARATUS FOR CONTROLLING CONTACT BETWEEN A HEAD AND A MAGNETIC TAPE BY CONTROLLED SPOUTING OF AIR IN THE VICINITY OF THE HEAD

[75] Inventors: Kenmei Masuda, Yokohama; Nobuyuki Kaku, Kanagawa; Shigemitsu Higuchi, Fujisawa; Tomomi Okamoto, Chigasaki; Fukuyasu Abe, Fujisawa; Shigeyuki Kobata, Odawara, all of Japan

[73] Assignee: Hitachi, Ltd., Tokyo, Japan

[21] Appl. No.: 101,299

[22] Filed: Aug. 3, 1993

[30] Foreign Application Priority Data

| Aug. 3, 1992 | [JP] | Japan | 4-206772 |
| Nov. 13, 1992 | [JP] | Japan | 4-304076 |
| Apr. 22, 1993 | [JP] | Japan | 5-096098 |
| May 7, 1993 | [JP] | Japan | 5-106943 |

[51] Int. Cl.⁶ ............................. G11B 15/64
[52] U.S. Cl. ................... 360/130.24; 360/102; 360/107
[58] Field of Search ........... 360/130.24, 102, 69, 360/107

[56] References Cited

U.S. PATENT DOCUMENTS

| 3,110,889 | 11/1963 | Morley et al. | 360/102 |
| 3,435,442 | 3/1969 | Ma et al. | 360/102 |
| 3,939,493 | 2/1976 | Fowler et al. | 360/102 X |
| 4,641,214 | 2/1987 | Imanishi et al. | 360/130.24 |
| 5,041,937 | 8/1991 | Saito | 360/130.24 |
| 5,303,106 | 4/1994 | Kiko | 360/130.24 X |

FOREIGN PATENT DOCUMENTS 3-78141  4/1991  Japan.

*Primary Examiner*—Aristotelis Psitos
*Assistant Examiner*—James L. Habermehl
*Attorney, Agent, or Firm*—Antonelli, Terry, Stout & Kraus

[57] ABSTRACT

A recording/playback apparatus including a stationary drum on which a traveling magnetic tape is wound, a plurality of magnetic heads for recording and playing back data, a rotary portion which is rotated while carrying the heads thereon, a drive portion which drives the rotary portion, an air injection device which spouts air from the vicinities of the magnetic heads toward the magnetic tape in order to separate the tape from the heads, and a control device which controls the start and stop of the air spouting of the air injection device. In the standby mode of the apparatus, in which the rotary portion is rotated though the heads perform neither the recording nor the playback operation, the tape is separated from the heads, so that the heads are prevented from wearing away. As soon as the standby mode has ended, the tape is brought into contact with the heads, so that the recording or playback operation can be immediately started.

15 Claims, 32 Drawing Sheets

FIG. 5

○ OPERATING
× STOPPED

| ELEMENT / MODE | ROTARY HEAD DEVICE 13 | PRSS CNT MEANS 11 | CAPSTAN 15 | REEL MTR 251, 252 | BRAKES 261, 262 |
|---|---|---|---|---|---|
| EJECT | × | × | × | × | × |
| UL.STOP | × | × | × | × | ○ |
| L.STOP | × | × | × | × | ○ |
| R.STOP | ○ | ○ B | × | × | × |
| PB/REC | ○ | ○ A | ○ | ○ | × |

FIG. 14
| POSITION / TECHNIQUE | HEAD DEVICE ENTRANCE | HEAD DEVICE EXIT |
|---|---|---|
| PRIOR ART | 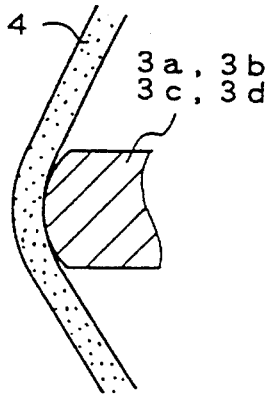 | 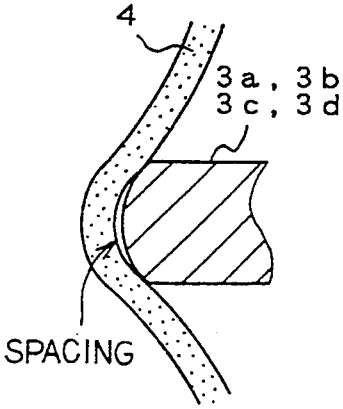 |
| EMBODIMENT | 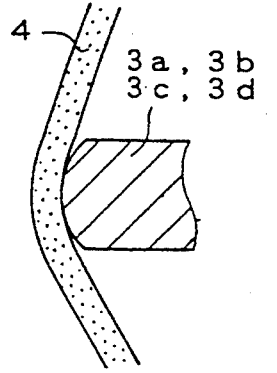 | 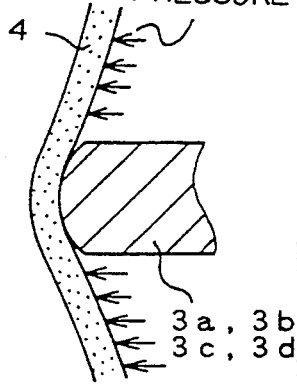 |

RECORDING/PLAYBACK APPARATUS FOR CONTROLLING CONTACT BETWEEN A HEAD AND A MAGNETIC TAPE BY CONTROLLED SPOUTING OF AIR IN THE VICINITY OF THE HEAD

BACKGROUND OF THE INVENTION

1. Field of the Invention

The present invention relates to a recording/playback apparatus of a helical scanning system. More particularly, it relates to a recording/playback apparatus which is endowed with the function of controlling the contact between a head and a magnetic tape.

2. Description of the Related Art

In a conventional video tape recorder (VTR), a magnetic tape is held at a stop in the state in which the tape is wound on a rotary head, when in a standby mode such as during the pause of playback or picture recording. Moreover, during the standby mode, the rotary head is kept rotating steadily in order to restart the playback or picture recording operation quickly when the pause has been released or canceled.

Also in a conventional data streamer, during a standby for the transfer of data from a host computer, a head is kept rotating in the state in which a magnetic tape at a stop is wound round a rotary head device, in order that the data may be recordable as soon as the standby has ended.

In this manner, while the conventional VTR or data streamer is on standby, the tape is kept wound round the rotary head device in the stopped state, and the head is steadily rotating. Therefore, the head continues to slidingly move on the same part of the tape. In consequence, both the head and the tape wear away severely. This situation incurs the problem that the tape part in contact with the head is damaged due to the wear, so the reliability of the recorded data lowers. As another problem, magnetic powder developed by the wear of the tape and the head accumulates around the head and hampers the normal operation of the head, so the apparatus is prone to going out of order.

With the intention of relieving such problems incurred between the head and the tape, there has been proposed a method wherein the tension of the tape is temporarily relaxed. Also proposed is a method disclosed in U.S. Pat. No. 3,961,372 wherein a rotary shaft in the rotary head device is hollowed to form an air circulation passage and wherein air is supplied into the rotary head so as to spout the air from the whole of the periphery of the rotary head, whereby the tape is entirely floated away from the rotary head to become out of contact with the head.

However, with either of the prior-art methods of relaxing the tape tension temporarily and floating the whole peripheral tape part by the spouting of air, the tape is entirely separated from the rotary head and is slackened. In shifting from the standby mode to the recording or playback mode, therefore, the apparatus needs to wind the tape round the rotary head device again. Consequently, a time period for rewinding the separated tape is required. Moreover, in the case where the tape once slackened by the separation is wound again, it is difficult to bring the head back into precise contact with the end point of the data recorded on the tape before the separation. Therefore, a time period for seeking the end point of the recorded data is required after the tape has been rewound. In this manner, the prior-art method of relaxing the tape tension or floating the tape part at the whole periphery of the rotary head by the spouting of the air has the problem that a long restarting time is expended in shifting from the standby mode to the subsequent recording/playback mode. Further, the prior-art method has the problem that the tape slackened in the standby state comes off tape guides for the rotary head and sags until the edges thereof damage due to rubbing against the tape guides.

The present invention has for its object to provide a recording/playback apparatus which can prevent the wear of a rotary head and the damage of a magnetic tape in the standby state of rotating the head with the tape wound on the head, and which can record or play back data immediately after the standby.

SUMMARY OF THE INVENTION

In order to accomplish the above object, according to the present invention, there is provided a recording/playback apparatus for recording and playing back data on and from a magnetic tape, comprising:

a stationary drum which includes a cylindrical outer peripheral surface for winding the traveling tape thereon, a plurality of heads which record and play back the data on and from the tape, a rotary portion which is rotated about an axis of the stationary drum while carrying the heads thereon, and a drive portion which drives and rotates the rotary portion; and air injection means for spouting air only in the vicinities of the heads outward of the rotary portion in order to separate the tape from the heads in a state in which at least part of the tape is wound on the stationary drum, and control means for controlling start and stop of the air spouting of the air injection means.

In the magnetic recording/playback apparatus of the present invention, the tape is wound on the outer peripheral surface of the stationary drum. The heads are carried on the rotary portion which is arranged to be coaxial with the drum. The heads record and play back the data while being moved relatively to the tape in contact therewith by the rotation of the rotary portion. Upon receiving a command from the control means, the air injection means spouts the air only from the vicinities of the heads of a rotary head device and forcibly separates tape parts from the rotary heads owing to an air pressure, thereby floating the tape parts away from the heads.

In the present invention, the air injection means is contrived so as to spout the air from only the vicinities of the heads, so that only the parts of the tape lying in contact with the heads are floated. Since the tape has a flexibility, tape parts onto which the air is not spouted remain wound round the stationary drum. The construction in which only the parts of the tape corresponding to the heads are separated in this manner is an original technique which has been established by the inventors with note taken of the flexibility of the tape.

In a case where the pressure of the air spouted by the air injection means is high or intense, a spacing develops between the tape and each head as stated above. On the other hand, in a case where the pressure of the air spouted by the air injection means is low or weak, the pressure of the contact between the tape and each head can be lowered. During the standby state of the apparatus, therefore, the air is intensely spouted by the air injection means, whereby the heads and the corresponding tape parts can be separated to prevent them from wearing away. Since, in this case, the tape parts not corresponding to the heads are kept wound round the rotary head device, the tape does not slacken. In shifting the apparatus from the standby state into a recording or playback state, accordingly, the tape is brought into contact with the heads immediately by stopping the spouting of the air, whereupon the data can be recorded or played back. On the other hand, when the air is weakly spouted during the recording or playback state, the contact pressure between the tape and each head can be lowered. Therefore, the wear can be relieved, and the state of the contact between the tape and each head can be held appropriate.

BRIEF DESCRIPTION OF THE DRAWINGS

FIG. 5 as an explanatory diagram showing the operating conditions of mechanical elements which constitute the recording/playback apparatus illustrated in FIG. 1;

FIG. 14 is an explanatory diagram showing tape deformations around the heads in the prior art and the present invention for comparison's sake;

PREFERRED EMBODIMENTS OF THE INVENTION

Figure 1:
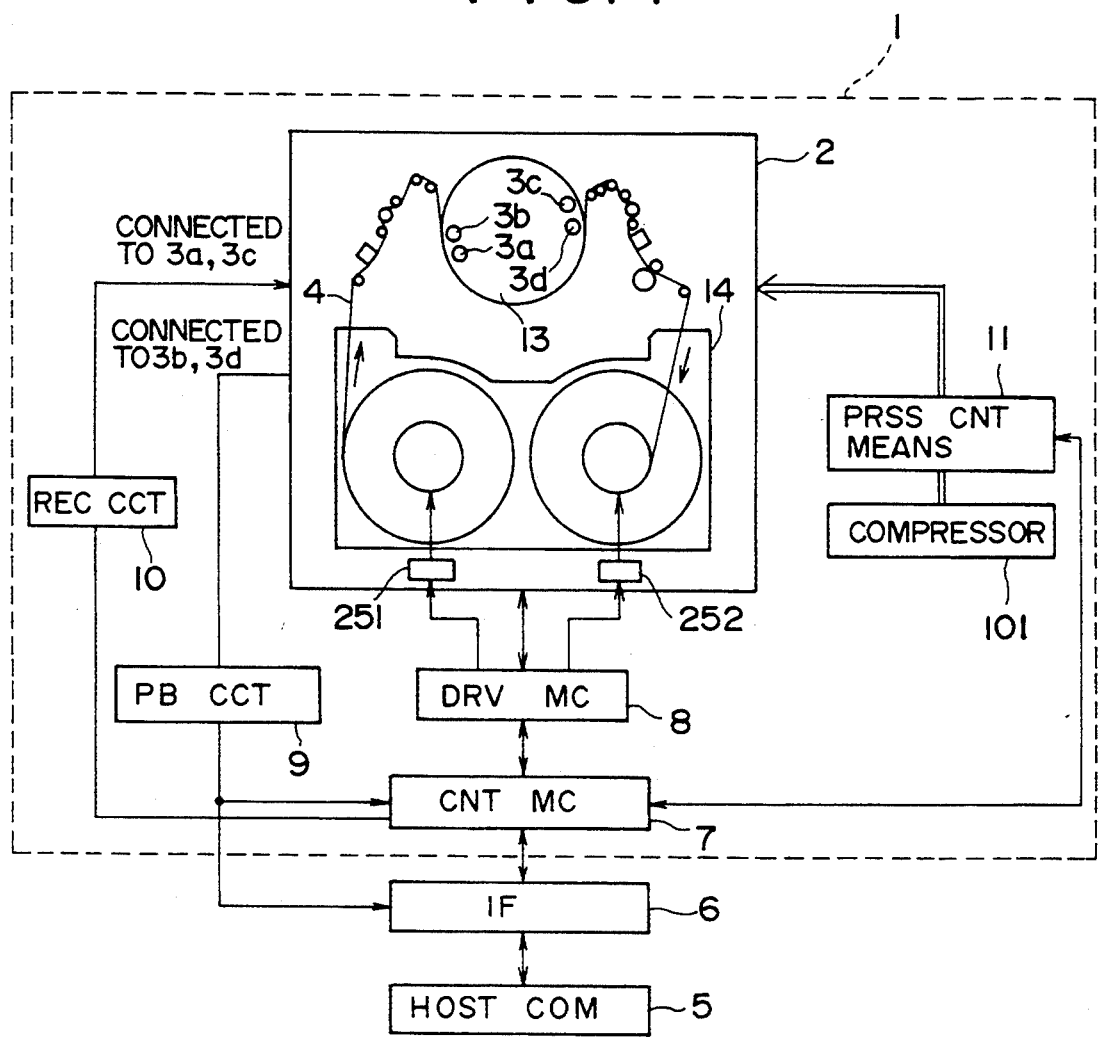
FIG. 1 is a block diagram of a recording/playback apparatus in the first embodiment of the present invention.

Recording/playback apparatuses embodying the present invention will be described below in conjunction with the accompanying drawings.

Embodiment 1

The construction of a recording/playback apparatus in the first embodiment of the present invention will be described with reference to FIG. 1.

The recording/playback apparatus 1 of this embodiment is constructed comprising a recording/playback mechanism assembly 2 which causes a magnetic tape 4 to travel along a predetermined traveling path for the purpose of recording or playing back data, a drive microcomputer 8 which controls the operations of the mechanisms of the recording/playback mechanism assembly 2, a compressor 101 which supplies air to a rotary head device 13 within the recording/playback mechanism assembly 2, pressure control means 11 for regulating the pressure of the air to be supplied by the compressor 101, and a control microcomputer 7 which commands the pressure control means 11 to operate. The drive microcomputer 8 is connected with the control microcomputer 7, and is controlled by this control microcomputer 7.

The recording/playback apparatus 1 is further provided with a recording circuit 10 which receives a signal to-be-recorded and delivers the received signal to the recording/playback mechanism assembly 2, and a playback circuit 9 which receives a signal reproduced by the recording/playback mechanism assembly 2. In addition, a host computer 5 outside the apparatus 1 is connected to the control microcomputer 7 through an interface 6. The playback circuit 9 is connected to both the control microcomputer 7 and the interface 6. The recording circuit 10 is connected to the control microcomputer 7.

Next, the operation of the recording/playback apparatus in this embodiment will be described.

The host computer 5 transfers data to-be-recorded to the control microcomputer 7 through the interface 6. The control microcomputer 7 sends the data to the recording circuit 10 so as to record the data on the magnetic tape 4. Simultaneously, the control microcomputer 7 causes the playback circuit 9 to play back the just recorded data and accepts the played-back data so as to verify that data. In a case where any error has developed, the microcomputer 7 causes the recording circuit 10 to record the data again. Although a data memory is further required for this purpose, it is omitted from the illustration of FIG. 1.

The control microcomputer 7 commands the pressure control means 11 to feed compressed air into the rotary head device 13 of the recording/playback mechanism assembly 2. It also designates the pressure of the compressed air. The pressure control means 11 regulates the pressure of the compressed air from the compressor 101 in compliance with the designation. Then, it supplies the air into the rotary head device 13, thereby causing parts of the tape 4 to float from the rotary head device 13, as will be discussed later. The control microcomputer 7 gives the command for the injection of the air in accordance with the operation mode of the recording/playback apparatus.

Next, the construction of the recording/playback mechanism assembly 2 will be explained in greater detail with reference to FIG. 2.

Figure 2:
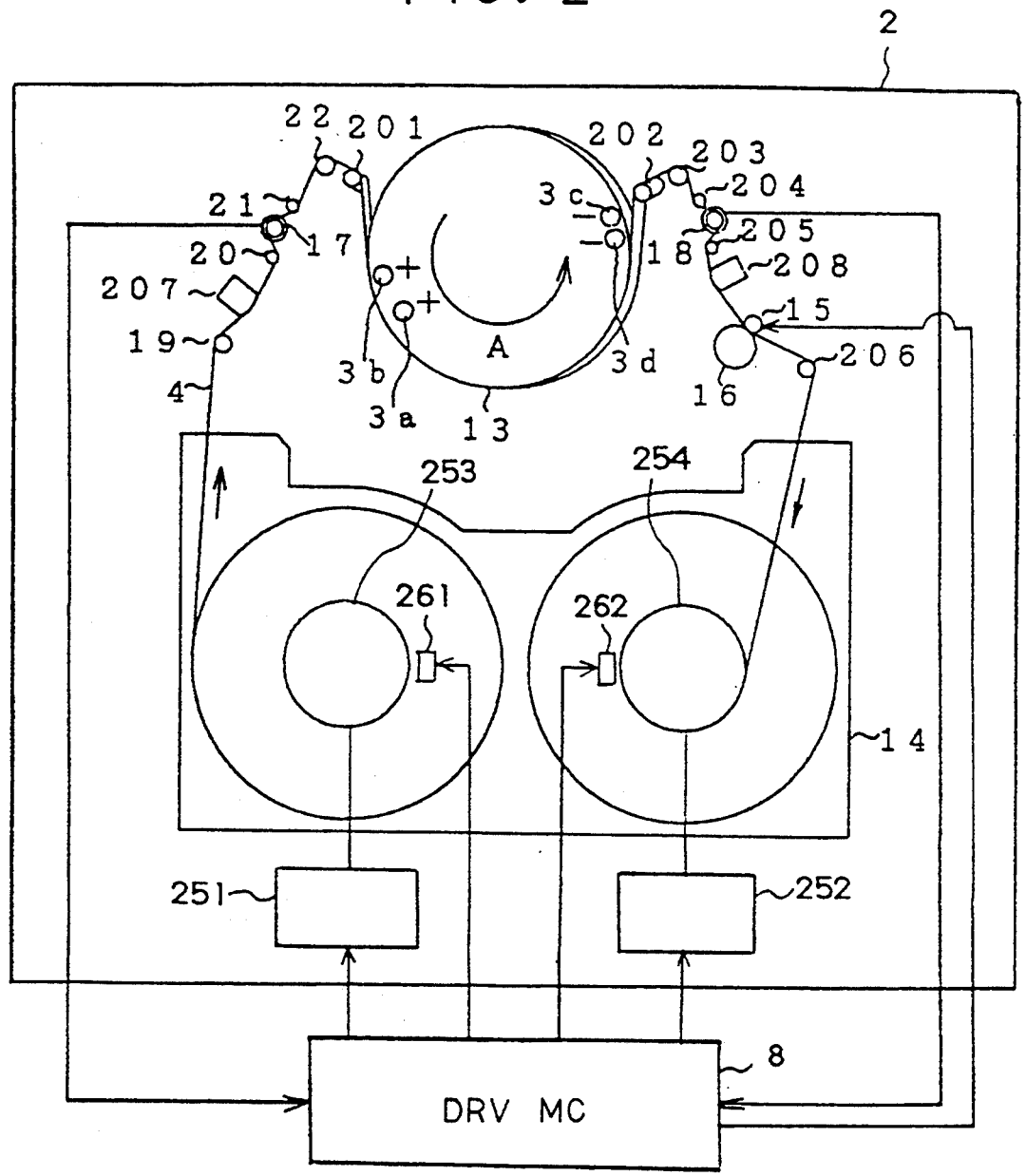
FIG. 2 is a block diagram of a recording/playback mechanism assembly which is included in the recording/playback apparatus illustrated in FIG. 1.

The recording/playback apparatus 1 comprises the rotary head device 13 in which heads 3a, 3b, 3c and 3d are mounted as shown in FIG. 2. The heads 3a and 3b are arranged in an identical azimuth section of + (plus), while the heads 3c and 3d are arranged in an identical azimuth section of − (minus). The heads 3a and 3c are connected to the recording circuit 10 as indicated in FIG. 1. On the other hand, the heads 3b and 3d are connected to the playback circuit 9. The detailed construction of the rotary head device 13 will be described later.

In the recording/playback mechanism assembly 2, there are also arranged a feed side reel motor 251 which rotates a feed side reel 253 in a cassette 14, and a takeup side reel motor 252 which rotates a takeup side reel 254. The reel motors 251 and 252 are connected to the drive microcomputer 8. In addition, the feed side reel 253 and the takeup side reel 254 are respectively furnished with brakes 261 and 262 for stopping the rotations thereof. The brakes 261 and 262 have their operation controlled by the drive microcomputer 8.

Guide rollers 22 and 203, tilt guides 201 and 202, and tape guides 19, 20, 21, 204, 205 and 206 are successively arranged between the cassette 14 and the rotary head device 13, and they serve to guide the tape 4, wound round the feed side reel 253 and drawn out of the cassette 14, along a predetermined traveling path, to be wound round the rotary head device 13 as shown in FIG. 2. A tension pin 17 is interposed between the tape guides 20 and 21, and a tension pin 18 between the tape guides 204 and 205. The tension pins 17 and 18 detect the tension of the tape 4. They are connected to the drive microcomputer 8 so as to deliver the signals of the detected tensions thereto.

In addition, a full-width erasing head 207 is interposed between the tape guides 19 and 20. A fixed head 208, and a pinch roller 16, as well as a capstan 15 for causing the tape 4 to travel, are interposed between the tape guides 205 and 206. The capstan 15 is connected to the drive microcomputer 8, and has its operation controlled by this microcomputer.

The recording/playback mechanism assembly 2 operates as explained below.

The rotary head device 13 is driven by a drum motor not shown in FIG. 2, and is rotated in a direction A indicated in the figure. The operation of the drum motor is under the control of the drive microcomputer 8. The tape 4 travels at a constant speed owing to the rotation of the capstan 15. The tape 4 is subjected to recording by the heads 3a and 3c of the rotary head device 13, and to playback by the heads 3b and 3d.

The tension of the tape 4 in upper and lower streams with respect to the rotary head device 13 is sensed by the tension pins 17 and 18, respectively. Herein, the tension is measured in terms of frictional forces, and the lower stream tension is usually more intense because the takeup side reel motor 252 exerts a greater torque on the takeup side reel 254 constantly. The drive microcomputer 8 controls a torque which the feed side reel motor 251 exerts on the feed side reel 253, in accordance with the mean value of the tensions detected by the tension pins 17 and 18. Thus, the upper stream tension of the tape 4 is controlled and is usually increased.

In this regard, the control microcomputer 7 gives a command to the servo circuit of the drive microcomputer 8 so as to stably control the revolution speeds or r.p.m. values of the drum motor and the capstan 15.

Figure 3:
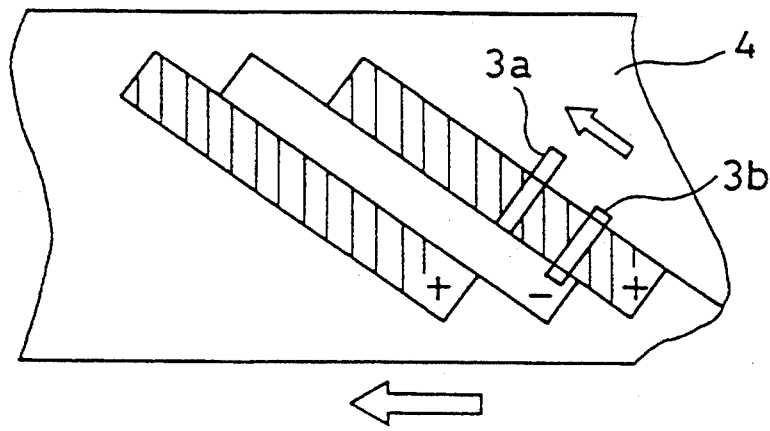
FIG. 3 is an explanatory diagram showing the positional relationships of the rotary heads (3a and 3b) of the recording/playback apparatus illustrated in FIG. 2, with respect to a magnetic tape (4)

Next, a tape format based on the recording/playback apparatus 1 will be explained with reference to FIG. 3.

In recording data, the + (plus) azimuth track of the magnetic tape 4 is recorded by the head 3a, and it is directly played back by the head 3b which scans the tape 4 with a time delay. The played-back signal of the head 3b is input to the control microcomputer 7. Then, the control microcomputer 7 checks whether the data have been properly recorded. The − (minus) azimuth track of the tape 4 is similarly recorded by the head 3c and played back by the head 3d. In this manner, the recording/playback apparatus 1 of this embodiment has the head layout in which the playback heads 3b and 3d retrace the predetermined recording tracks corresponding respectively to the recording heads 3a and 3c.

Figure 4:
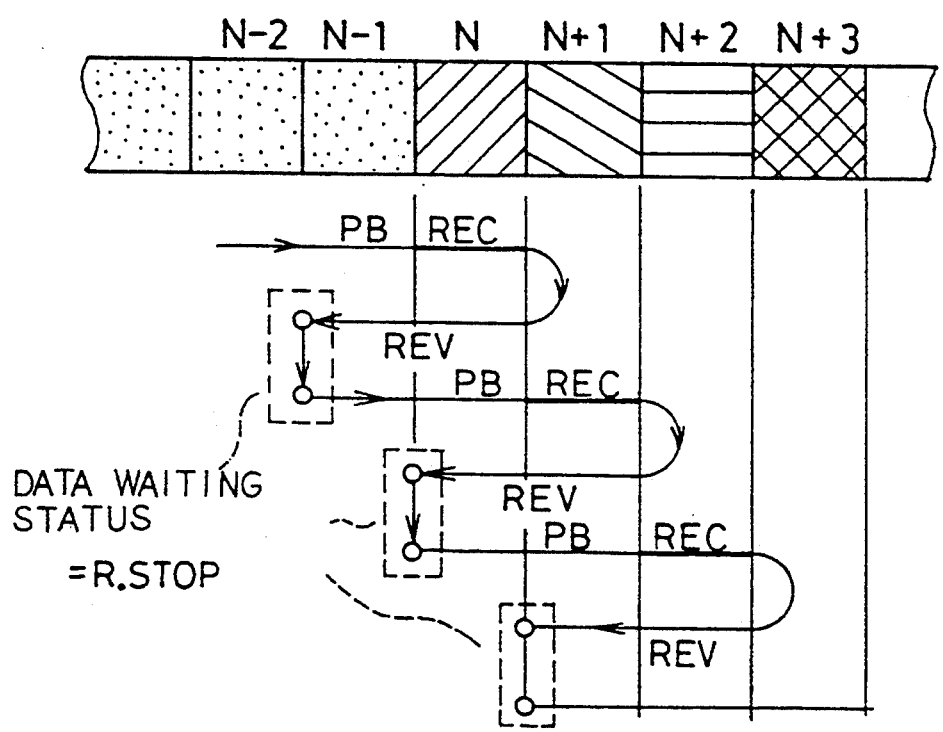
FIG. 4 is an explanatory diagram showing the data recording or playing back operation of the recording/playback apparatus illustrated in FIG. 1.

Next, the operations of the apparatus 1 for recording and playing back data will be explained with reference to FIG. 4.

The data transferred from the host computer 5 are successively recorded by the heads 3a and 3c while the tape 4 is being divided in the longitudinal direction thereof. Here, for the brevity of explanation, data recorded at one stroke in a predetermined time period shall be called a "group", and individual groups shall be respectively named "(N−2)", "(N−1)", "N", "(N+1)", "(N+2)" and "(N+3)" as indicated in FIG. 4. It is now assumed that the data of the group N have been recorded. In a case where the data of the next group (N+1) are not continuously received, the tape 4 is once rewound to the group (N−1) by a reverse playback (REV) mode while the apparatus 1 awaits the transfer of the data of the group (N+1). Then, the apparatus 1 stands by in this state. The "standby" signifies the status in which the tape 4 is at a stop, but the rotary head device 13 is rotating. Hereinbelow, the standby status shall be called the "R. STOP mode".

As soon as the data of the group (N+1) have been transferred from the host computer 5 in the R. STOP mode, the apparatus 1 falls into a playback (PB) mode, in which the data of the group N are first fetched and in which an area to be recorded is searched for. The apparatus 1 falls into a recording (REC) mode when the area has been searched for. In this manner, the recording/playback apparatus 1 of this embodiment is a system in which the data transferred intermittently are recorded in succession on standby.

The operations of the recording/playback apparatus 1 of this embodiment include "EJECT", "UL. STOP" and "L. STOP" modes in addition to the aforementioned "R. STOP", "PB" and "REC" modes. As to each of these operating modes, whether the mechanical elements are operated or stopped will be explained with reference to FIG. 5. This figure is a table which indicates whether the rotary head device 13, pressure control means 11, capstan 15, reel motors 251 and 252, and brakes 261 and 262 are operated in each of the operating modes.

The EJECT mode is for ejecting the cassette 14. In the EJECT mode, none of the mechanical elements is operated, as indicated in FIG. 5. The UL. (unloading) STOP mode is the status in which the rotary head device 13 is at a stop without the tape 4 wound round it. Since this mode is for setting the cassette 14, the brakes 261 and 262 are operated. As soon as the cassette 14 has been set in the status of the UL. STOP mode, tape loading is performed to wind the tape 4 round the rotary head device 13. On this occasion, the brakes 261 and 262 are applied so as to prevent the tape 4 from slackening. The status in which the rotary head device 13 is at a stop while the tape 4 is being wound round this device, is the L. (loading) STOP mode.

In the R. STOP (standby) mode, the rotary head device 13 is rotated, the pressure control means 11 is operated, and the capstan 15, the reel motors 251, 252 and the brakes 261, 262 are all unoperated. In this mode, the injection of air under a high or intense pressure (mode B) is set for the pressure control means 11, as indicated in FIG. 5, and the high pressure air (in the mode B) is discharged from the vicinities of the heads 3a, 3b, 3c and 3d of the rotary head device 13. In the playback/recording (PB/REC) mode, the injection of air under a low or weak pressure (mode A) is set for the pressure control means 11, the low pressure air (in the mode A) is spouted from the vicinities of the heads 3a, 3b, 3c and 3d of the rotary head device 13, and the tape 4 is caused to travel in the state in which the air is being spouted.

Accordingly, in the case where the recording/playback of data are not performed as in the R. STOP mode among the operating modes shown in FIG. 5, the service lives of the heads 3a, 3b, 3c and 3d can be markedly enhanced by separating the tape 4 from the heads 3a∼3d so as to be in a noncontact state, by spouting the high pressure air (in the mode B). Also in the case where the tape 4 needs to be in contact with the heads 3a, 3b, 3c and 3d as in the playback/recording (PB/REC) mode, the service lives of the heads 3a∼3d can be enhanced by discharging the low pressure air (in the mode A) so that the contact pressures between the tape 4 and the heads 3a∼3d may have the required minimum value.

Next, the structure of the rotary head device 13 in this embodiment will be explained in detail with reference to FIGS. 6, 7, 8, 9, 10 and 11.

Figure 6:
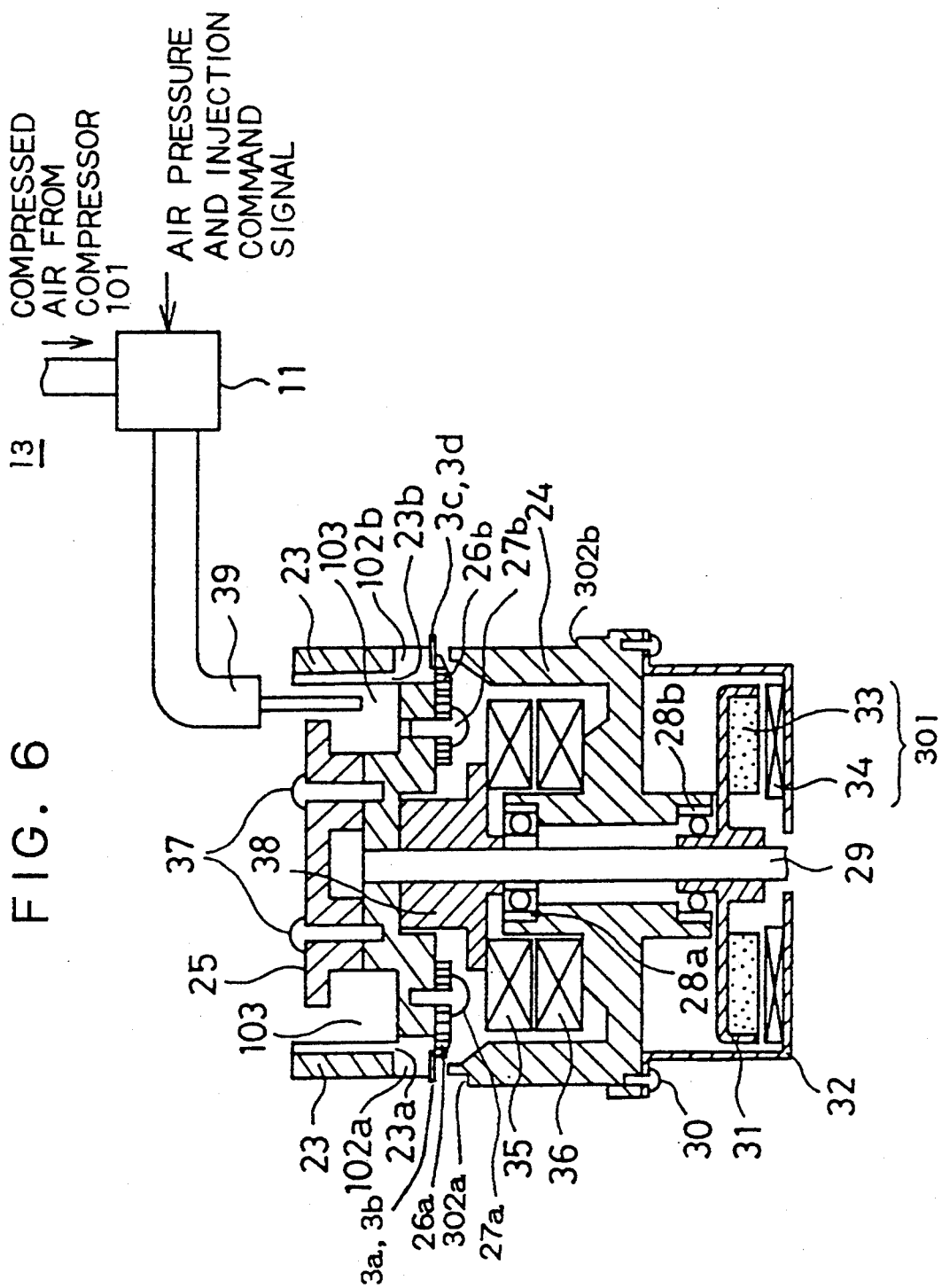
FIG. 6 is a sectional view showing the construction of a rotary head device (13) which is included in the recording/playback apparatus illustrated in FIG. 1.

As illustrated in FIG. 6, the rotary head device 13 has a split construction consisting of an upper rotary drum 23 which has a cylindrical external shape, and a lower stationary drum 24 which is fixed to the body of the recording/playback apparatus. Tape guides 302a and 302b for guiding the tape 4 are arranged at the outer periphery of the lower stationary drum 24.

Figure 8:
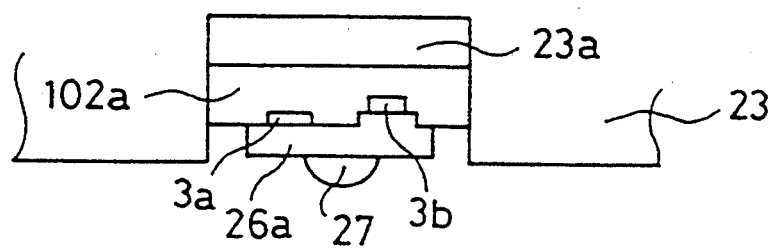
FIG. 8 is a front view of an opening (102a) which is formed in the rotary drum (23) of the rotary head device (13) illustrated in FIG. 6.
Figure 9:
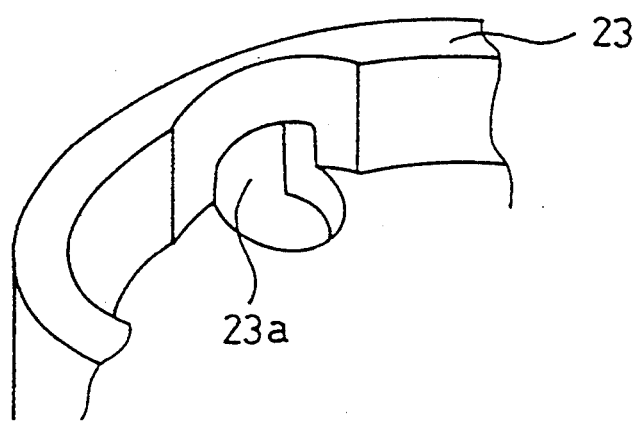
FIG. 9 is a fragmentary perspective view of the rotary drum (23) of the rotary head device (13) illustrated in FIG. 6.

A head base 26a for carrying the heads 3a and 3b thereon, and a head base 26b for carrying the heads 3c and 3d thereon are respectively fixed inside the upper rotary drum 23 by screws 27a and 27b. The heads 3a and 3b are mounted on the head base 26a, and they protrude outside the upper rotary drum 23 through a slot 102a provided in this drum 23. Likewise, the heads 3c and 3d are mounted on the head base 26b, and they protrude outside the upper rotary drum 23 through a slot 102b provided in this drum 23. As shown in FIG. 8, the open width of the slot 102a is substantially equal to the width of the head base 26a. Also, the open width of the slot 102b is substantially equal to the width of the head base 26b.

In order to feed the compressed air into the slots 102a and 102b, a duct 103 communicating with these slots 102a and 102b is formed in the upper part of the upper rotary drum 23 in such a manner as to be unitary with this upper rotary drum 23. The duct 103 is held in communication with the slots 102a and 102b through respective openings 23a and 23b which underlie this duct 103 (refer also to FIG. 9). A cover 25 is fixed to the upper part of the upper rotary drum 23 by screws 37. The cover 25 reduces the upward open area of the duct 103 lest the air in the duct 103 should escape upwardly. The compressed air sent from the compressor 101 and the pressure control means 11 shown in FIG. 1 is fed into the duct 103 by a nozzle 39.

Figure 7:
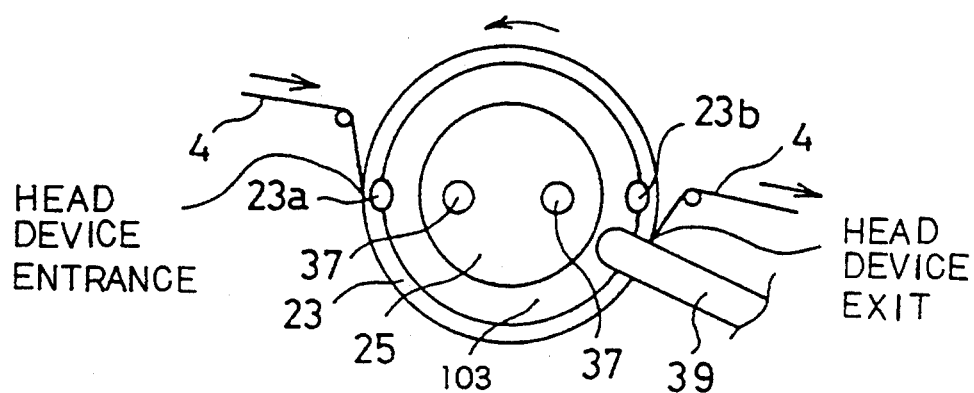
FIG. 7 is a plan view showing the construction of the rotary head device (13) which is included in the recording/playback apparatus illustrated in FIG. 1.

As can be seen from FIGS. 6 and 7, the nozzle 39 has its distal end inserted into an opening which overlies the duct 103. The tip of the nozzle 39 is situated at a so-called "head device exit" being a position at which the tape 4 ends its winding round the upper rotary drum 23 and begins to advance toward the takeup reel 254. The pressure control means 11 includes a solenoid valve, and supplies the air of regulated air pressure into the nozzle 39 in compliance with the command delivered from the control microcomputer 7.

Mounted on the upper rotary drum 23 is a disk 38 to which the rotor 35 of a rotary transformer is bonded. A rotary shaft 29 is press-fitted in the through hole of the disk 38 and is journalled to turn in two bearings 28a and 28b. The stator 36 of the rotary transformer is fixed to the lower stationary drum 24 in opposition to the rotor 35. Also, a motor 301 is mounted on the lower stationary drum 24. A magnet holder 31 to which the magnet 33 of the motor 301 is bonded, is fixed at one end of the rotary shaft 29. A motor holder 32 in which the coil 34 of the motor 301 is arranged so as to oppose to the magnet 33, is fixed to the lower stationary drum 24 by a plurality of screws 30. Leads for supplying a voltage to the motor 301 are omitted from the illustration.

Figure 10:
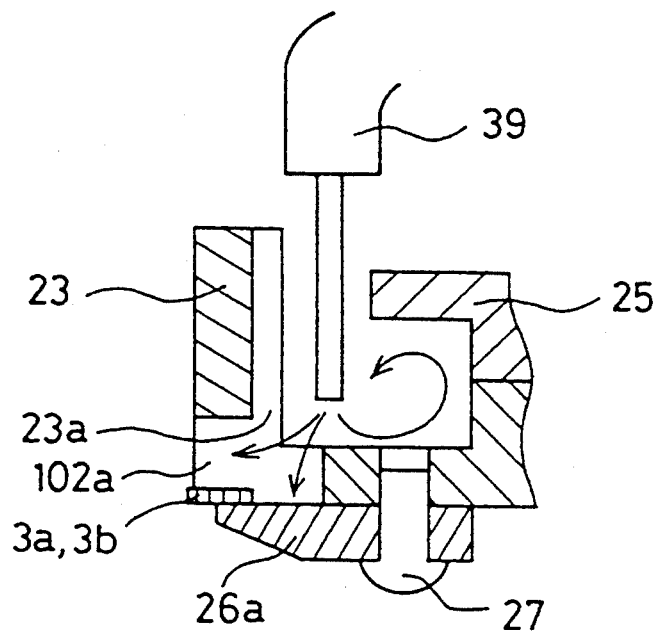
FIG. 10 is a fragmentary vertical sectional view of the rotary drum (23) of the rotary head device (13) illustrated in FIG. 6.
Figure 11:
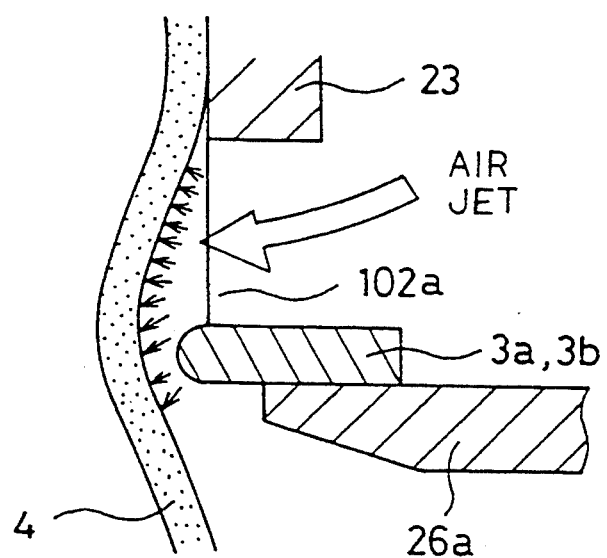
FIG. 11 is a fragmentary vertical sectional view showing the contact state between the magnetic tape (4) and the rotary drum (23) of the rotary head device (13) illustrated in FIG. 6.

FIGS. 10 and 11 illustrate an air jet occurring upon injection of the air by the nozzle 39, and the behavior of the tape 4 at that time, respectively. The air injected from the nozzle 39 passes through the opening 23a and is spouted out of the slot 102a as can be seen from FIG. 10. In consequence, the air moves the tape 4 enveloping the heads 3a, 3b, and it lowers the pressures of the tape 4 acting on the heads 3a, 3b. The contact forces between the heads 3a, 3b and the tape 4 can be controlled in accordance with the magnitude of the pressure of the air which is to be injected. Likewise, the air is spouted out of the slot 102b, and the contact forces of the tape 4 on the heads 3c, 3d can be controlled. In the case where the pressure of the air to be injected is high, the tape 4 is separated or disengaged from the heads 3a, 3b, 3c and 3d as can be seen from FIG. 11.

In order to clarify the essential feature of the present invention, this embodiment will be further described in comparison with the prior art.

Figure 13:
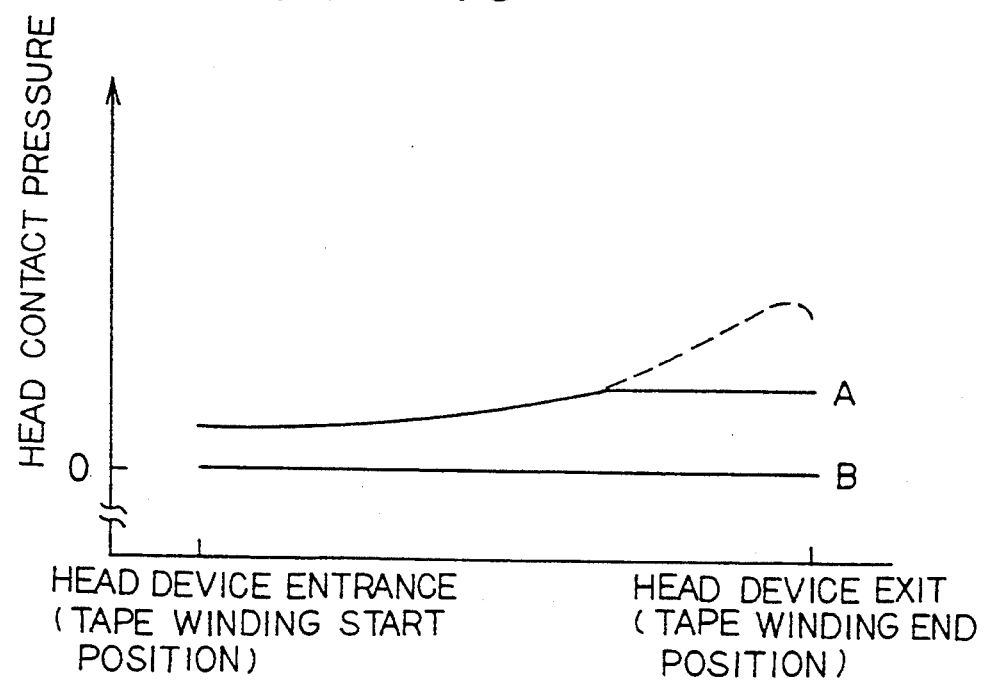
FIG. 13 is a graph showing the distributions of the contact pressures between the head and the magnetic tape in the cases of spouting air in the rotary head device in the first embodiment.

FIG. 13 illustrates those contact pressures between the tape 4 and each of the heads $3a \sim 3d$ which are developed by changing the injection pressure of the air in the rotary head device 13 of this embodiment. As already explained with reference to FIG. 5, the mode A is used for the PB/REC modes of the operation of the apparatus. This mode A corresponds to the air injection pressure under which the contact force sufficient to record or play back data is developed between the tape 4 and each of the heads $3a \sim 3d$. On the other hand, the mode B is used for the R. STOP mode in which the apparatus neither records nor plays back data. In this mode B, therefore, the air injection pressure separates the tape 4 from each of the heads $3a \sim 3d$ completely, and the contact force between the tape 4 and each head can be rendered substantially null as shown in FIG. 13. Owing to such proper uses of the modes A and B, the tape 4 and the heads $3a \sim 3d$ can be subjected to reduced wearing away during the recording/playback in the PB/REC modes of the operation of the apparatus, while they can be prevented from wearing away in the R. STOP mode.

Figure 12:
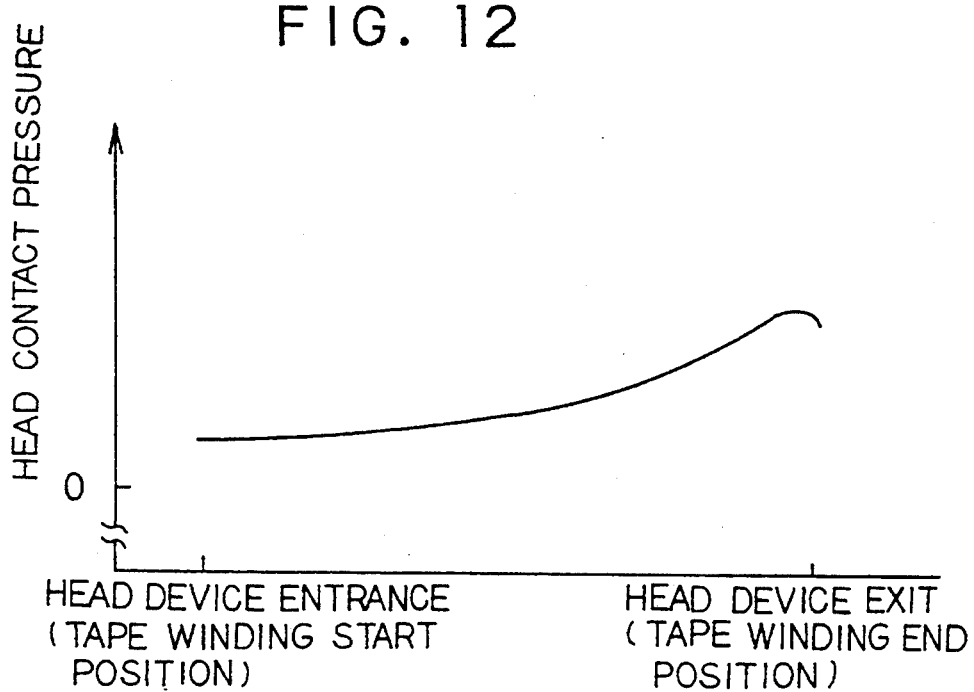
FIG. 12 is a graph showing the distribution of the contact pressure between a head and a magnetic tape in a rotary head device in the prior art.

The magnetic recording apparatus as in this embodiment is so constructed that the tape 4 proceeds in the same direction as the rotating direction of the rotary head device 13. With a prior-art rotary head device having no air injection, therefore, the pressure under which a magnetic tape is wound round the rotary head device becomes higher toward the exit of this head device as illustrated in FIG. 12. Accordingly, a great difference is exhibited by the contact pressures between each of the rotary heads ($3a \sim 3d$ shown in FIG. 14) and the magnetic tape (4 shown in FIG. 14) at the entrance and exit of the rotary head device. As illustrated in FIG. 14, in the prior art, when the contact pressure between the tape 4 and each of the heads $3a \sim 3d$ is adjusted so as to have an appropriate value at the entrance of the rotary head device, the contact pressure at the exit of the head device increases excessively, and a spacing appears between the tape 4 and the outer end of each of the heads $3a \sim 3d$ at the head device exit. The reason therefor is that, at the exit of the rotary head device the contact pressure of the tape 4 is greater due to a higher tape tension, so the tape 4 embraces each head tightly. To the contrary, when the contact pressure between the tape 4 and each of the heads $3a \sim 3d$ and the shape of the outer end of each head are regulated so as to prevent the spacing between each head and the tape 4 from appearing at the head device exit, the tape 4 cannot embrace each head sufficiently at the head device entrance, and the contact thereof with each head becomes unstable. When the contact of the tape 4 with each head is unstable in this manner, the recording/playback of the apparatus cannot be stably performed. Moreover, especially at the head device exit of greater contact forces, the tape 4 and the heads 3a~3d wear away severely.

In order to eliminate the above drawbacks, this embodiment has the tip of the nozzle 39 located at the exit of the rotary head device 13 (or the upper rotary drum 23) as shown in FIG. 7. Thus, the pressure of the air to be spouted onto the tape 4 becomes higher at the head device exit than at the head device entrance, and the contact pressure of the tape 4 on each head which would otherwise be higher at the head device exit is effectively lowered, whereby a substantially uniform contact pressure can be attained round the rotary head device 13 as indicated by letter A (the mode A) in FIG. 13. Since the excessive head contact force can be alleviated in this way, the contact of the tape 4 with each of the heads 3a~3d can be stabilized at both the head device entrance and exit as shown in FIG. 14, and the recording/playback can be stably performed. Moreover, the contact force between each of the heads 3a~3d and the tape 4 can be moderated at both the head device entrance and exit, and the service life of each head can be remarkably enhanced.

Besides, with the rotary head device 13 of this embodiment, the air is spouted from only the slots 102a and 102b where the heads 3a, 3b and the heads 3c, 3d are respectively arranged. Accordingly, the tape 4, except its parts confronting the heads 3a~3d, remains wound round the rotary head device 13. Therefore, in a case where the operation of the apparatus is shifted from the standby mode (R. STOP mode) to the recording/playback modes (REC/PB modes), the injection of the air is changed-over from the mode B to the mode A, whereby the tape 4 immediately comes into close contact with the heads 3a~3d under appropriate contact pressures, and the recording/playback can be properly performed. Since the tape 4, except its parts confronting the heads 3a~3d, is held wound round the rotary head device 13 as stated above, the tape 4 does not come off the tape guide 302a or 302b of the lower stationary drum 24, and the edge parts of the tape 4 are not prone to damage due to rubbing against the tape guide 302a or 302b, either. In addition, owing to the above wound state of the tape 4, the positional shift of the tape 4 is not caused by the injection of the air in the mode B, and the same parts of the tape 4 as the parts having been in contact with the heads 3a~3d before the standby mode can be subjected to the recording/playback immediately without the necessity of searching for the pertinent tape parts for the recording/playback.

Embodiment 2

Now, a recording/playback apparatus in the second embodiment of the present invention will be described with reference to FIGS. 15 and 16.

The rotary head device 13 in the first embodiment as shown in FIG. 6 is constructed having the two slots 102a and 102b, in which the heads 3a, 3b and the heads 3c, 3d are respectively arranged. On the other hand, the rotary head device of the recording/playback apparatus in the second embodiment has two further slots 102c and 102d, as well as the two slots 102a and 102b, in the upper rotary drum 23 as can be seen from FIG. 15. Magnetic heads 3e, 3f and 3g, 3h, which differ in type from the heads 3a, 3b and 3c, 3d, are respectively arranged in the slots 102c and 102d. The rotary head device of the second embodiment can cope with two different types of tape 4. Either the heads 3a~3d or the heads 3e~3h are selectively used in accordance with the type of tape 4 which is loaded in the cassette 14.

Figure 15:
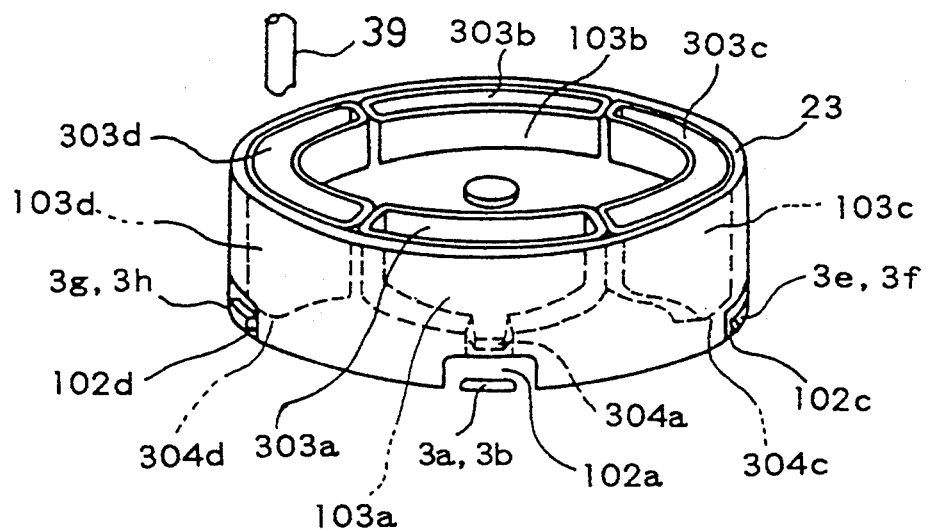
FIG. 15 is a perspective view showing the configuration of ducts in a rotary head device which is included in a recording/playback apparatus in the second embodiment of the present invention.
Figure 16:
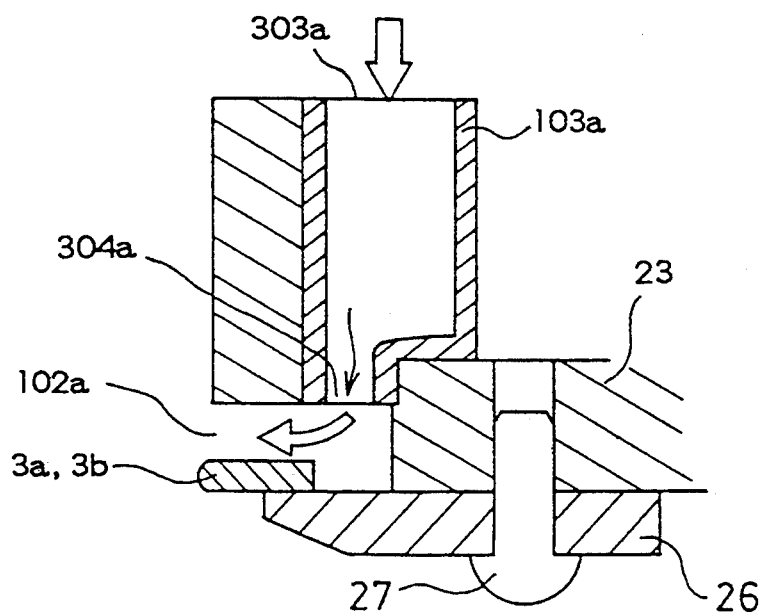
FIG. 16 is a fragmentary vertical sectional view showing the rotary head device of the recording/playback apparatus in the second embodiment as illustrated in FIG. 15.

As shown in FIG. 15, four ducts 103a, 103b, 103c and 103d are respectively arranged in the upper rotary drum 23 in correspondence with the four slots 102a, 102b, 102c and 102d. The ducts 103a, 103b, 103c and 103d are respectively held in communication with the slots 102a, 102b, 102c and 102d by openings 304a, 304b, 304c and 304d. The nozzle 39 blows air into the upper rotary drum 23 through those openings 303a, 303b, 303c and 303d of the respective ducts 103a, 103b, 103c and 103d which are close to the nozzle 39. As clearly shown in FIG. 16, the cross-sectional area of each of the openings 304a~304d remote from the nozzle 39 is smaller than that of each of the openings 303a~303d close to the nozzle 39. Thus, the flows of air fed through the openings 303a-303d is narrowed by the corresponding openings 304a-304 to increase the flow velocity, so that the air is vigorously spouted from the corresponding slots 102a-102d. Since the rest of the construction of the second embodiment is the same as in the first embodiment, it shall be omitted from description.

Embodiment 3

Now, a recording/playback apparatus in the third embodiment of the present invention will be described.

Figure 17:
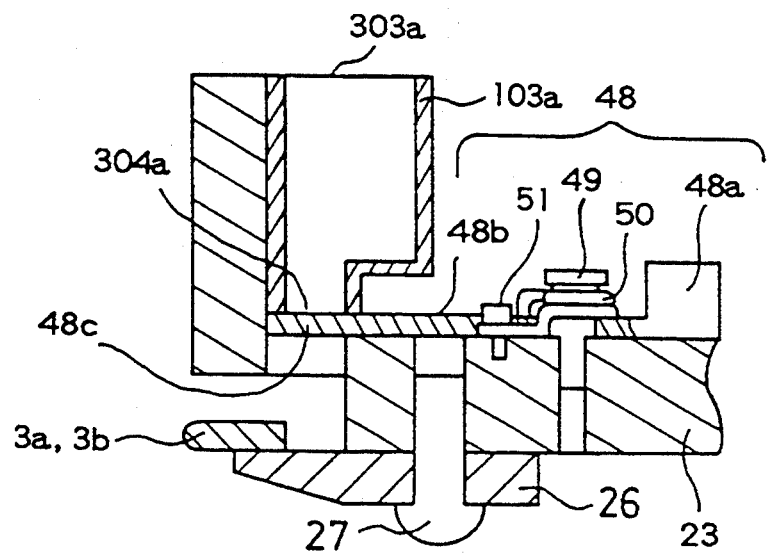
FIG. 17 is a fragmentary vertical sectional view of a rotary head device which is included in a recording/playback apparatus in the third embodiment of the present invention.
Figure 18:
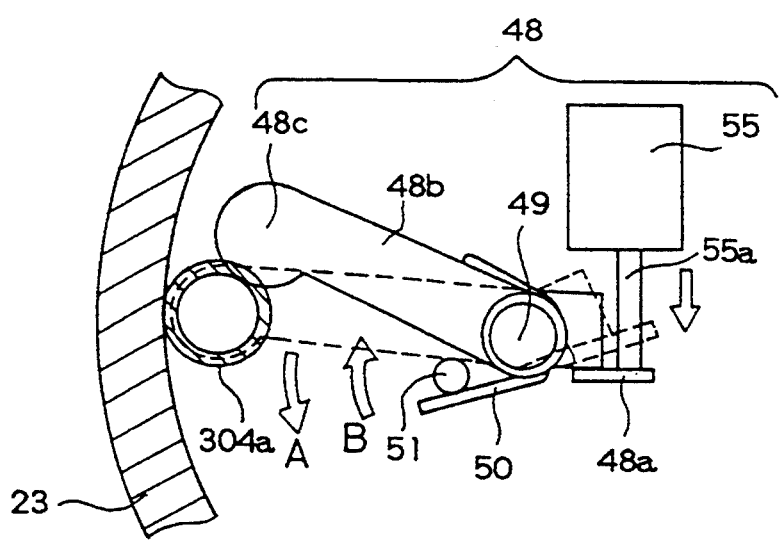
FIG. 18 is an explanatory view showing the operation of each turning arm in the rotary head device illustrated in FIG. 17.

As illustrated in FIGS. 17 and 18, the rotary head device of the recording/playback apparatus in the third embodiment includes the ducts 103a etc. each of which is arranged in correspondence with the plurality of heads in the same manner as in the second embodiment. According to the third embodiment, in order to instantly cut off the air which is spouted from the slots 102a etc. held in communication with the ducts 103a etc., turning arms 48 for instantly shutting OFF the corresponding openings 304a etc. of the ducts 103a etc. close to the heads 3a, 3b etc. are arranged for the respective ducts 103a etc.

As exemplified concerning the duct 103a in the illustration, the turning arm 48 is arranged so as to slide in contact with the bottom of the opening 304a. The turning arm 48 is constructed having an arbor 49, an arm member 48b which is adapted to turn around the arbor 49, a stopper 51 which stops the movement of the arm member 48b, and a torsion spring 50 which is held in engagement with both the stopper 51 and the arm member 48b. The torsion spring 50 urges the arm member 48b in a direction A indicated in FIG. 18. One end 48c of the arm member 48b is circular, and can shut OFF the opening 304a of the duct 103a completely. The other end of the arm member 48b is bent up into a portion 48a, which is adapted to engage with the distal end of the plunger 55a of a solenoid 55.

The operation of this embodiment is as stated below. In that mode A or B, and the PB/REC mode or R. STOP, mode of the apparatus in which the nozzle 39 injects the air, the plunger 55a of the solenoid 55 is held in engagement with the bent-up portion 48a, thereby to turn the arm member 48b against the torsion spring 50 in a direction B indicated in FIG. 18. Under this state, the lower opening 304a of the duct 103a is open as shown in FIG. 18. When the apparatus is to be shifted to any operating mode in which the air is not injected, a predetermined voltage is applied to the solenoid 55 (leads for applying the voltage are omitted from illustration). Then, the plunger 55a of the solenoid 55 is retracted to release the engagement thereof with the bent-up portion 48a of the arm member 48b. Thus, the turning arm 48 is turned by the torsion spring 50 in the direction A until the arm member 48 abuts against the stopper 51. On this occasion, the opening 304a is shut up by the circular portion 48c of the arm member 48b, so that the spouting of the air is instantly forcibly cut off. Accordingly, the heads 3a, 3b instantly come into contact with the tape 4.

Figure 22A:
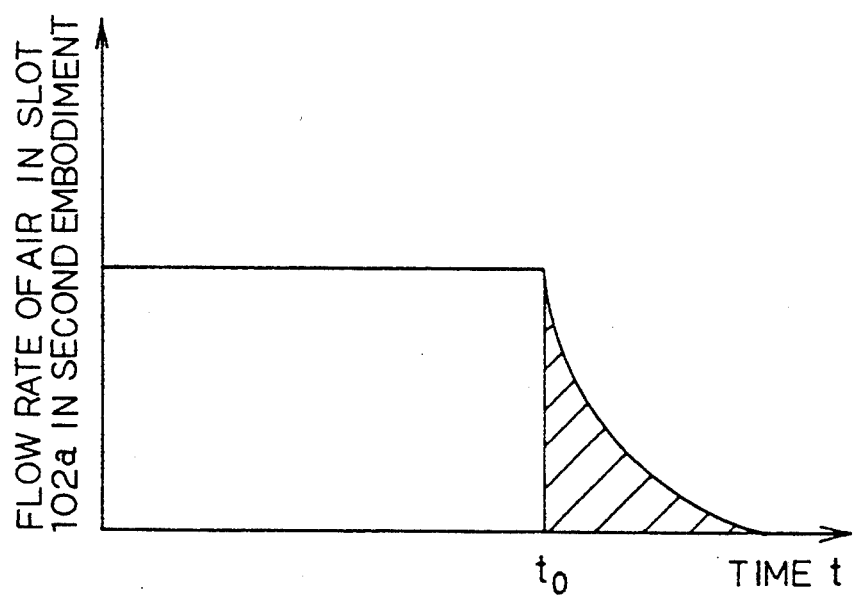
FIG. 22A is a graph showing the time variation of an air flow rate through the opening (102a) of the rotary head device which is included in the recording/playback apparatus in the second embodiment of the present invention.
Figure 22B:
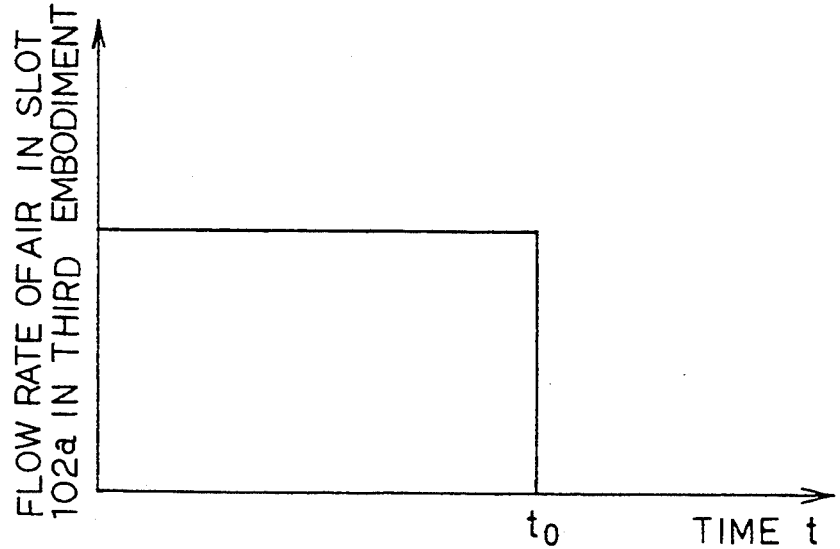
FIG. 22B is a graph showing the time variation of an air flow rate through the opening (102a) of the rotary head device which is included in the recording/playback apparatus in the third embodiment of the present invention.

There will be further explained the effect of the cutoff of the air in the case of arranging the turning arms 48 each of which forcibly cuts off the flow of the air. FIG. 22A illustrates the temporal variation of an air flow rate through the slot 102a in the second embodiment in which the turning arm 48 is not provided. On the other hand, FIG. 22B illustrates the temporal variation of an air flow rate through the slot 102a in the third embodiment. In the case of the second embodiment, even when the air injected by the nozzle 39 is to be checked from spouting at a time $t_0$, a residual air flow as indicated by hatching in FIG. 22A develops due to the dynamic inertia of the pressure control means 11 and the inertia of the air. In contrast, when the spouting of the air is forcibly cut off by the turning arm 48 in the third embodiment, the residual air flow as mentioned above can be avoided as is seen from FIG. 22B.

Embodiment 4

Figure 19:
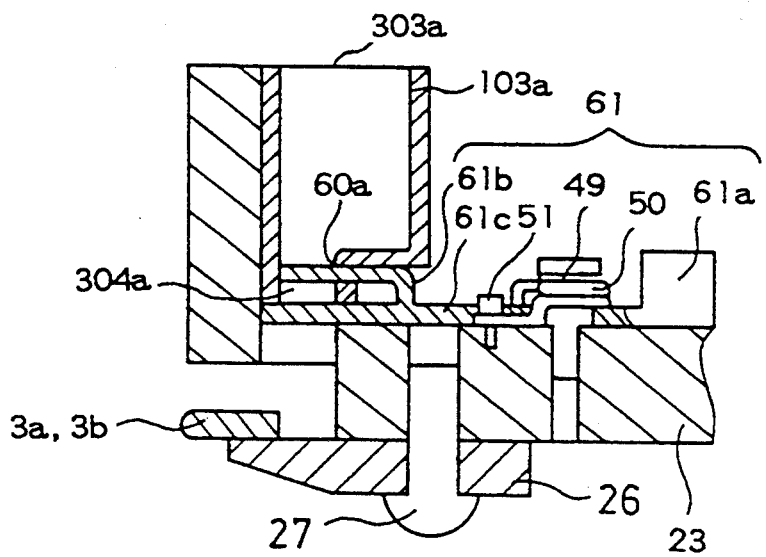
FIG. 19 is a fragmentary vertical sectional view of a rotary head device which is included in a recording/playback apparatus in the fourth embodiment of the present invention.
Figure 20:
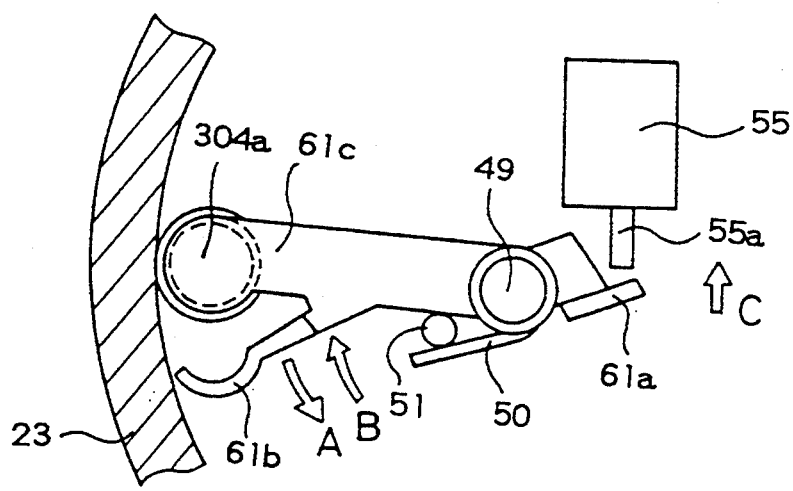
FIG. 20 is an explanatory view showing the operation of each turning arm in the rotary head device illustrated in FIG. 19.
Figure 21:
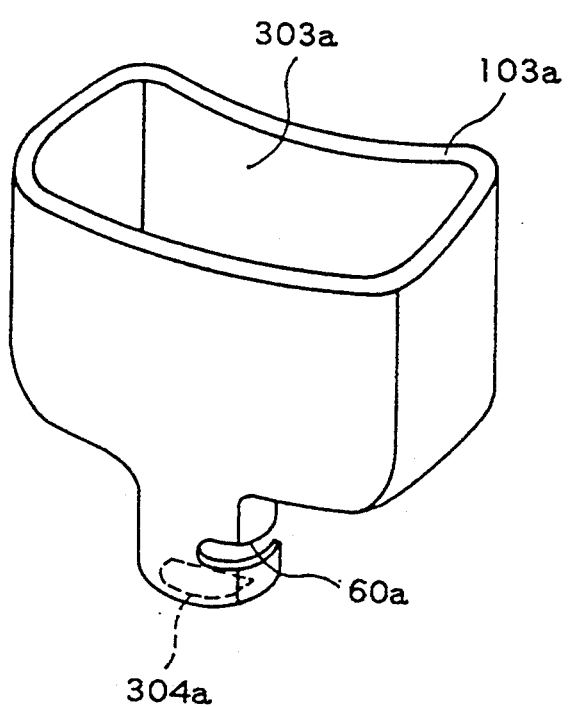
FIG. 21 is a perspective view of a duct which is included in the rotary head device illustrated in FIG. 19.

Now, a recording/playback apparatus in the fourth embodiment of the present invention will be described with reference to FIGS. 19, 20 and 21.

The basic construction of this embodiment is the same as that of the third embodiment shown in FIG. 17. The points of difference are that each duct exemplified by the duct 103a is provided with an air vent 60a as best shown in FIG. 21, and that each turning arm 61 has a bifurcate shape which consists of a shutting arm member 61c and an air vent shutting member 61b. The shutting arm member 61c is circular at one end close to the opening 304a of the duct 103a, and is bent up at the other end close to the plunger 55a of the solenoid 55. The air vent shutting member 61b is raised from the shutting arm member 61c, and is formed into a crescent at its distal end.

The operation of the turning arm 61 will be explained below. In each of the R. STOP mode and PB/REC modes in which the nozzle 39 injects the air, the solenoid 55 protrudes the plunger 55a to push the bent-up portion 61a of the shutting arm member 61c. Accordingly, the arm member 61c is moved in a direction B indicated in FIG. 20 until the opening 304a of the duct 103a is let open. On this occasion, the air vent shutting member 61b is brought into engagement with the air vent 60a of the duct 103a so as to shut up this air vent 60a.

Subsequently, when the operation of the apparatus is shifted to any other mode in which the nozzle 39 does not inject the air, the solenoid 55 retracts the plunger 55a in a direction C indicated in FIG. 20. Then, the arm member 61c is moved in a direction A indicated in FIG. 20 by the torsional couple of the torsion spring 50 until it abuts against the stopper 51. In consequence, the air vent shutting member 61b allows the air vent 60a of the duct 103a to open, whereas the arm member 61c shuts up the opening 304a of the duct 103a. Therefore, the air having been injected by the nozzle 39 and having accumulated in the duct 103a escapes through the air vent 60a, and the pressure of the air within the duct 103a is prevented from rising. The pressure rise within the duct 103a exerts an excessive force on the arbor 49 of the turning arm, so that the arbor 49 is liable to more play and might incur unstable operations. According to this embodiment, the temporary pressure rise within the duct 103a at the cutoff of the air can be prevented by discharging the air through the air vent 60a.

Embodiment 5

Each of the first, second, third and fourth embodiments described above has the drum structure which includes the lower stationary drum 24 and the upper rotary drum 23 being substantially equal in diameter thereto, and in which the magnetic heads 3a etc. are arranged in the upper rotary drum 23. However, the present invention is not restricted to the drum structure, but it may well have a structure in which the heads are rotated in the interspace between upper and lower stationary drums for winding the tape 4 thereon. The fifth embodiment has such a construction.

Figure 23:
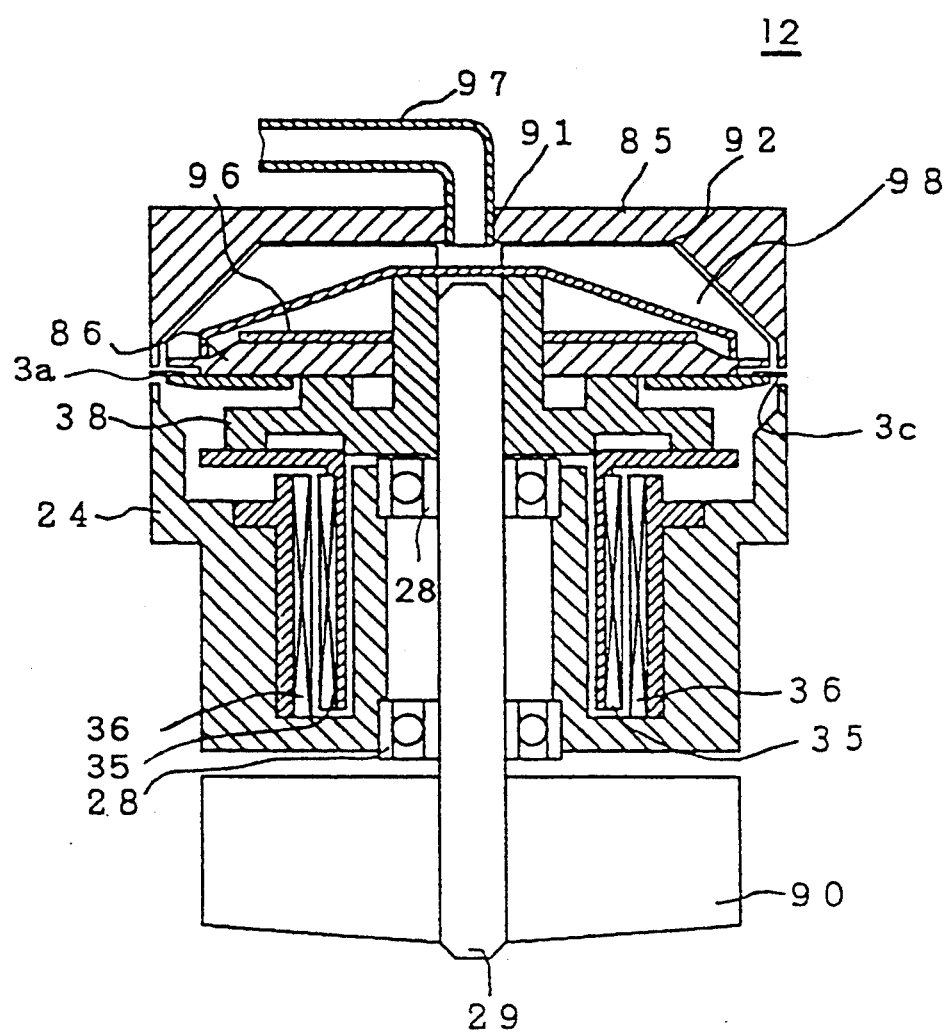
FIG. 23 is a sectional view of a rotary head device in the fifth embodiment of the present invention.
Figure 24:
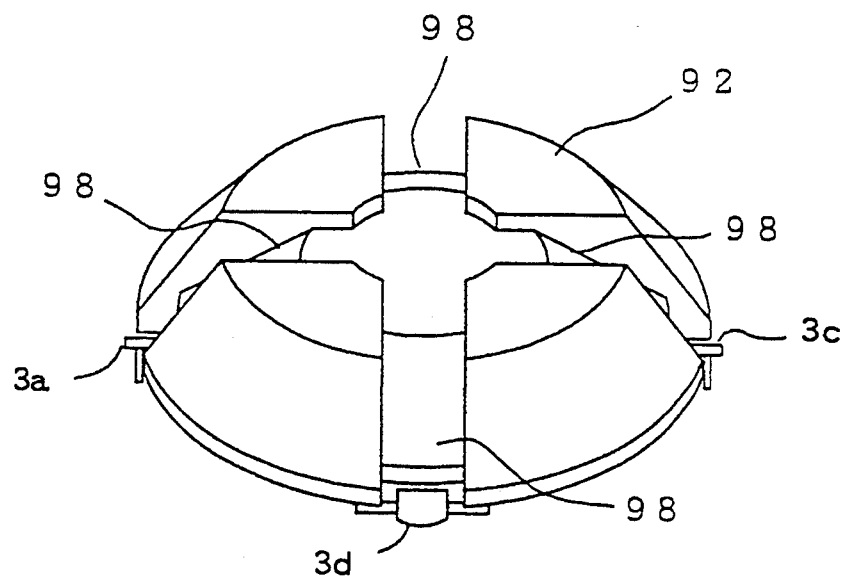
FIG. 24 is a perspective view showing a head (3a), a cover (92) which forms the air circulation passage (98) of the rotary head device illustrated in FIG. 23, and so forth.

A magnetic recording/playback apparatus in the fifth embodiment of the present invention with a rotary head device 12 of the type having the upper and lower stationary drums will be described with reference to FIGS. 23, 24, 25 and 26. FIG. 23 shows a sectional view of the rotary head device 12. As seen from FIG. 23, the rotary head device 12 includes the lower stationary drum 24, a middle rotary drum 86 and the upper stationary drum 85 which are stacked in succession from below. The lower stationary drum 24 has two bearings 28 press-fitted into the central part thereof. In addition, the stator 36 of a rotary transformer is fixed to the lower stationary drum 24. A rotary shaft 29 is supported by the two bearings 28.

The four heads 3a, 3b, 3c and 3d are fixed to the outer peripheral part of the middle rotary drum 86. Further, the middle rotary drum 86 is coupled with a disk 38. The rotary shaft 29 is press-fitted into the through hole of the disk 38. The rotor 35 of the rotary transformer is fixed to the disk 38. One end of the rotary shaft 29 is fixed to a motor 90, so that the disk 38 and the middle rotary drum 86 are driven to rotate by the motor 90. Also fixed to the middle rotary drum 86 are a cover 92, and a circuit board 96 for electrically connecting the rotary transformer rotor 35 and the heads 3a~3d. The cover 92 is arranged so as to partially reduce the gap between it and the confronting inner wall of the upper stationary drum 85.

The upper stationary drum 85 is centrally provided with a through hole 91 through which the air supplied from the compressor 101 (shown in FIG. 1) is introduced into this upper stationary drum 85. One end of a pipe 97 coupled to the compressor 101 is inserted into the through hole 91.

The cover 92 defines air circulation passages 98 by which the compressed air injected from the pipe 97, inserted in the through hole 91 of the upper stationary drum 85, is led to the heads 3a etc. The configuration of the cover 92 is clearly seen from FIG. 24. This figure is a perspective view showing the heads 3a etc. and the cover 92 which are fixed to the middle rotary drum 86. The air circulation passages 98 defined by the cover 92 are in the shape of straight grooves, and they extend radially from the central part of the cover 92 to the respective heads 3a etc.

In the magnetic recording/playback apparatus of this embodiment, the construction of the control system other than the rotary head device 12 is the same as in the first embodiment. Therefore, it shall be omitted from description.

The operating modes of the apparatus in which the air is injected are the R. STOP mode and the PB/REC modes as in the first embodiment. The air supplied from the compressor 101 into the rotary head device 12 through the pipe 97, flows to the heads 3a etc. along the air circulation passages 98 formed between the cover 92 and the upper stationary drum 85 and is spouted from only the surroundings of the heads 3a etc.

In this manner, according to this embodiment, the cover 92 is arranged to define the air circulation passages 98, whereby the air can be spouted from only the vicinities of the heads 3a etc. even in the rotary head device 12 of the type having upper and lower stationary drums. Thus, only the tape 4 held in contact with the heads 3a etc. can be floated by the air pressure in the same manner as in the first embodiment. It is therefore possible to completely separate the tape 4 from the heads 3a etc. in the R. STOP mode, and to regulate the contact pressure between the heads 3a etc. and the tape 4 to an appropriate value in the PB/REC modes. Moreover, those parts of the tape 4 which are not vicinal to the heads 3a etc. are held wound on the upper and lower stationary drums 85 and 24 of the rotary head device 12. Therefore, the tape 4 immediately comes into contact with the heads 3a etc. even in the case of the change-over from the R. STOP mode to either of the PB/REC modes or the change-over from either the R. STOP mode or the PB/REC modes to a mode in which the air is not spouted. In addition, since the positional shift of the tape 4 does not arise, the previous position thereof need not be searched for.

The cover 92 of the rotary head device 12 shown in FIG. 23 defines the straight air circulation passages 98 which connect the pipe 97 and the respective heads 3a etc. in a straightforward manner. However, this cover 92 is not restrictive, but a cover 192 shown in FIG. 25 or a cover 292 shown in FIG. 26 may well be employed.

Figure 25:
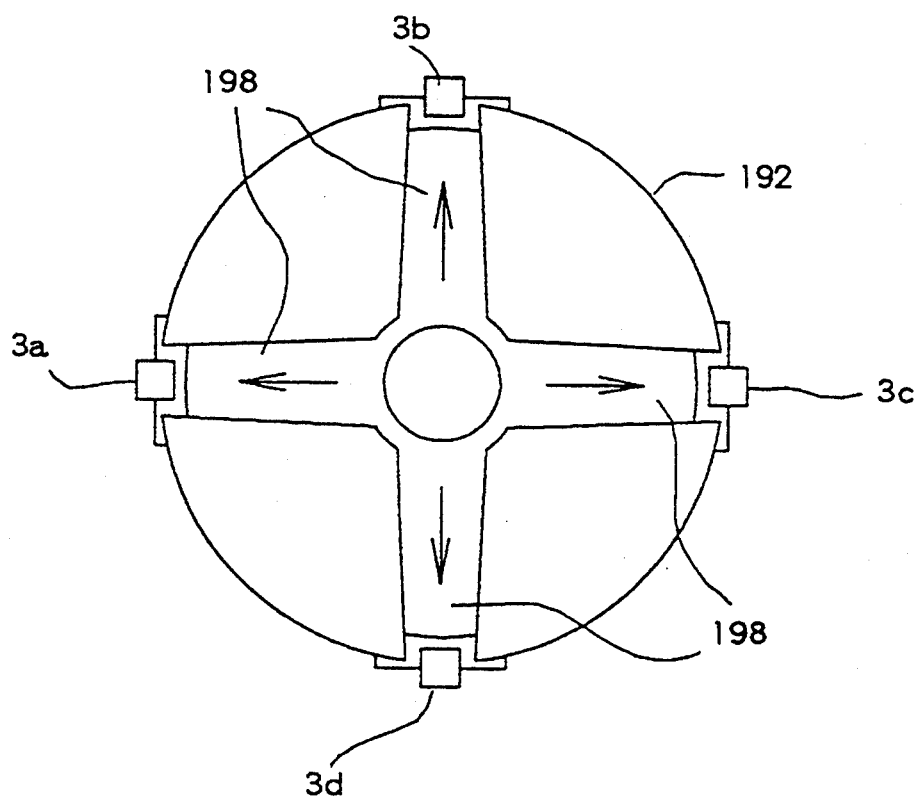
FIG. 25 is a plan view showing a head (3a), a tapered cover of a different kind (192) which is usable for the rotary head device illustrated in FIG. 23, and so forth.

The cover 192 depicted in FIG. 25 defines tapered air circulation passages 198 each having a cross-sectional area which decreases from the center of this cover 192 toward the corresponding one of the heads 3a etc. The sum of the areas of those outlets of the four air circulation passages 98 which are close to the respective heads 3a etc., is smaller than that of the areas of the inlets of the passages 98. Therefore, the air fed from the compressor 101 into the upper stationary drum 85 is efficiently led toward the heads 3a etc. by the passages 98.

Figure 26:
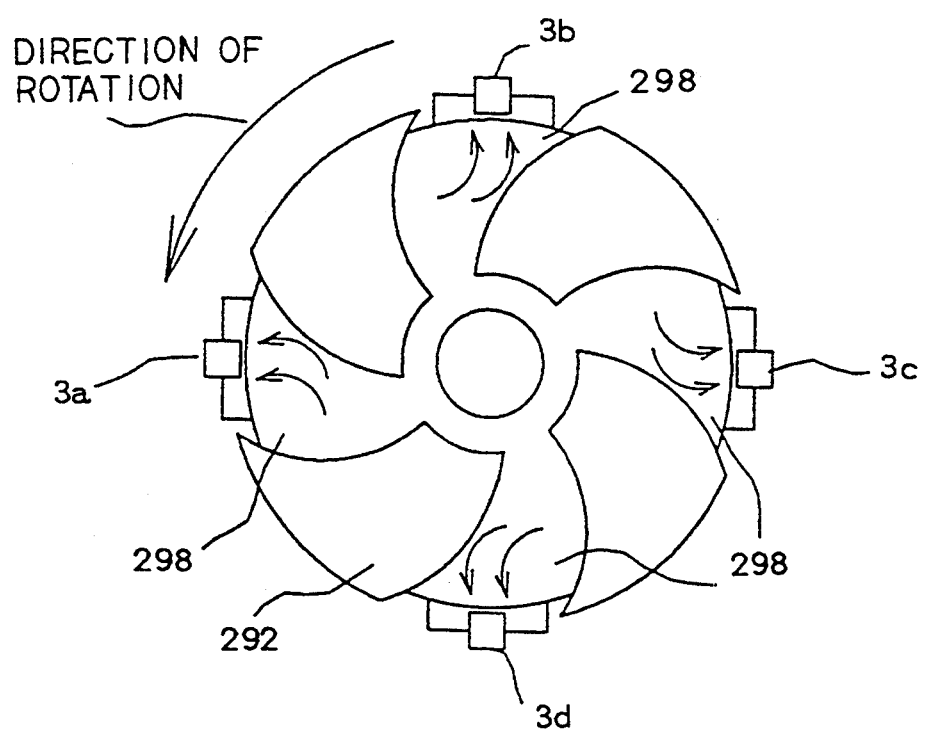
FIG. 26 is a plan view showing a head (3a), a spiral cover of a different kind (292) which is usable for the rotary head device illustrated in FIG. 23, and so forth.

The cover 292 depicted in FIG. 26 defines air circulation passages 298 in the shape of a vane wheel. When the cover 292 is rotated in the direction of the arrow, the vane wheel-shaped air circulation passages 298 operate so as to discharge the air in the upper stationary drum 85 dynamically and forcibly. Accordingly, the air supplied into the rotary head device 12 can be quickly spouted, and the air remaining inside the drum 85 at the cutoff of the air into this drum can be quickly discharged. It is therefore possible to enhance the responsiveness of the start and stop of the spouting.

Meanwhile, according to the rotary head device 12 shown in FIG. 23, the air is spouted from the vicinities of the heads 3a etc. even at that peripheral part of the device 12 on which the tape 4 is not wound. Since, however, the air is not used for floating the tape 4 at the part on which the tape 4 is not wound, the utilization factor of the supplied air worsens. In this regard, a block 93 (in FIG. 31) for fixing the upper and lower stationary drums 85 and 24 can be arranged as means for preventing the outflow of the air from the part on which the tape 4 is not wound. Such a rotary head device 12 employing the fixing block 93 is illustrated in FIG. 31 as a modification to the fifth embodiment.

Figure 31:
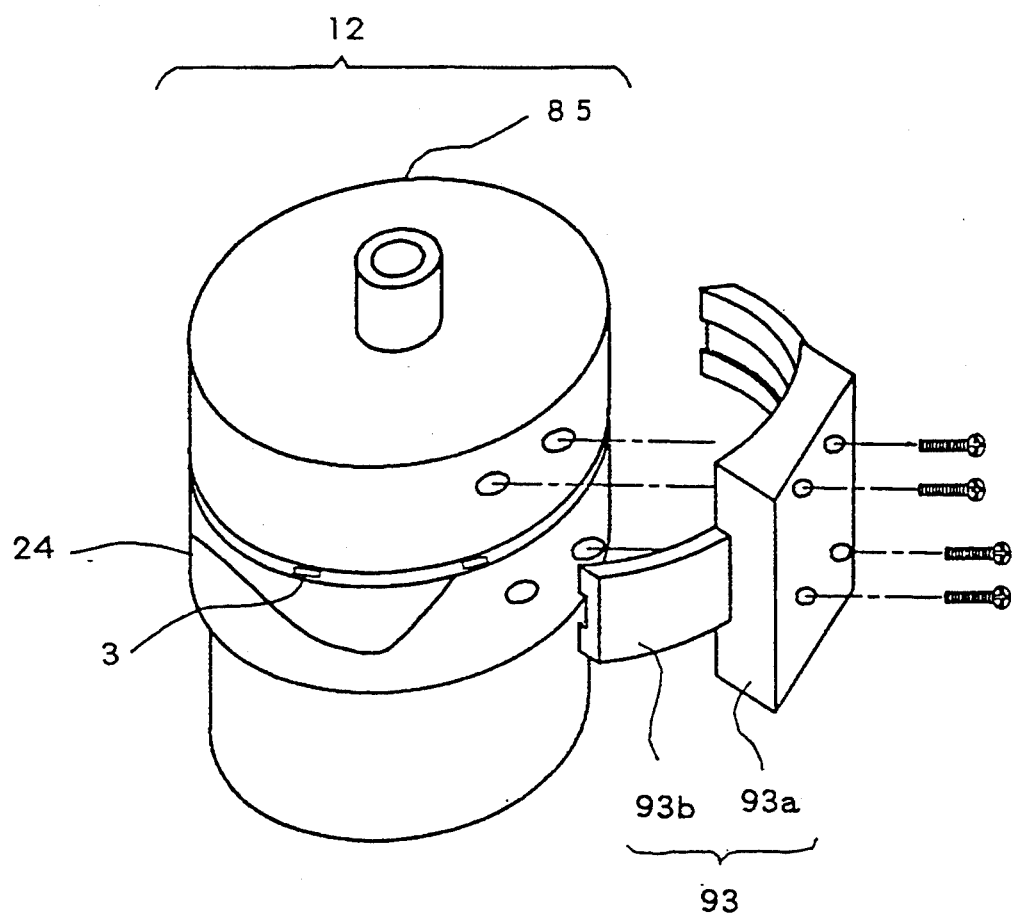
FIG. 31 is an explanatory view showing the positional relationship between the rotary head device illustrated in FIG. 23 and a fixing block which prevents air from leaking.

As shown in FIG. 31, the stationary drum fixing block 93 includes a holding member 93a which is screwed to the upper stationary drum 85 and the lower stationary drum 24 so as to hold them substantially coaxial, and a leakage preventing member 93b which covers the clearance between the upper stationary drum 85 and the lower stationary drum 24. The stationary drum fixing block 93, not only fixes the upper and lower stationary drums 85 and 24, but also seals that part of the rotary head device 12 on which the tape 4 is not wound. Accordingly, the block 93 can prevent the compressed air from leaking out.

Figure 32:
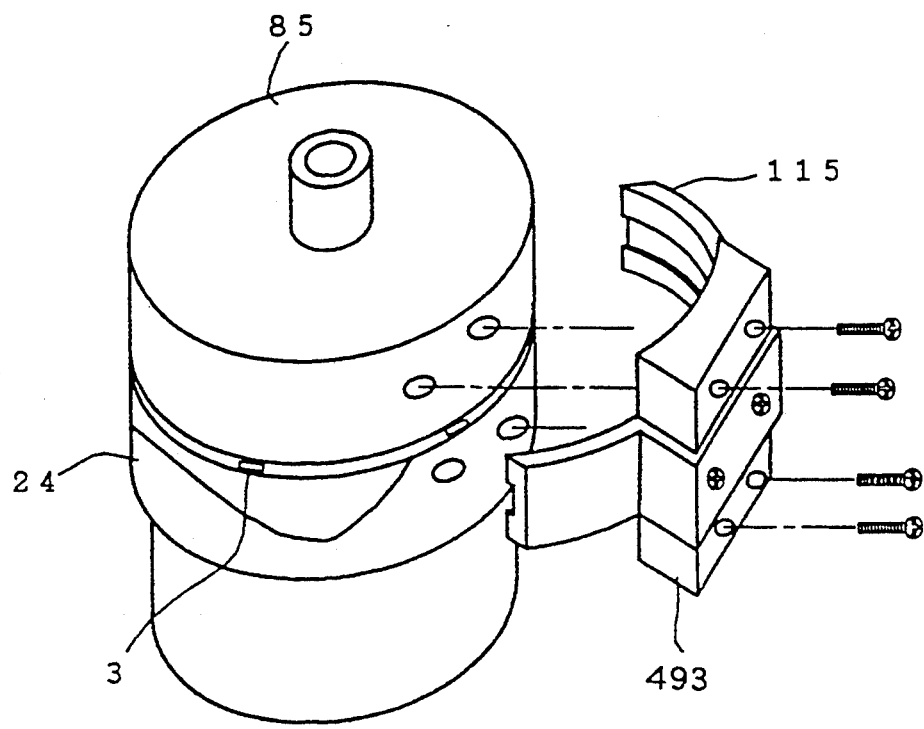
FIG. 32 is an explanatory view showing the positional relationship between the rotary head device illustrated in FIG. 23 and a fixing block which includes an elastic member for preventing air from leaking.

Another modification to the fifth embodiment is illustrated in FIG. 32. Herein, an elastic material is used for a leakage preventing member 115 which covers the clearance between the upper stationary drum 85 and the lower stationary drum 24 so as to prevent the spouted air from leaking out. Besides, as seen from FIG. 32, the leakage preventing member 115 is formed independently of a holding member 493 by which the upper stationary drum 85 and the lower stationary drum 24 are held substantially coaxial.

According to the modified embodiment shown in FIG. 32, the leakage preventing member 115, made of the elastic material, is fixed in the state in which it is pressed against the upper stationary drum 85 and the lower stationary drum 24. It is therefore possible to enhance the close contact of the leakage preventing member 115 with the upper stationary drum 85 as well as the lower stationary drum 24. Moreover, since the holding member 493 and the leakage preventing member 115 are not unitarily formed, the necessary precision of the components of the stationary drum fixing block are reduced.

Embodiment 6

In the preceding fifth embodiment, the air circulation passages are formed between the upper stationary drum 85 and the cover 92, 192 or 292. However, this structure is not restrictive, but the present invention may well have a structure which includes a first air circulation passage in the upper stationary drum 85 and a second air circulation passage in the rotary portion 86. The sixth embodiment which concerns the structure of the rotary head device of the type having the upper and lower stationary drums, will be described with reference to FIG. 27, FIGS. 33A and 33B, FIGS. 34A and 34B, and FIG. 35.

Figure 27:
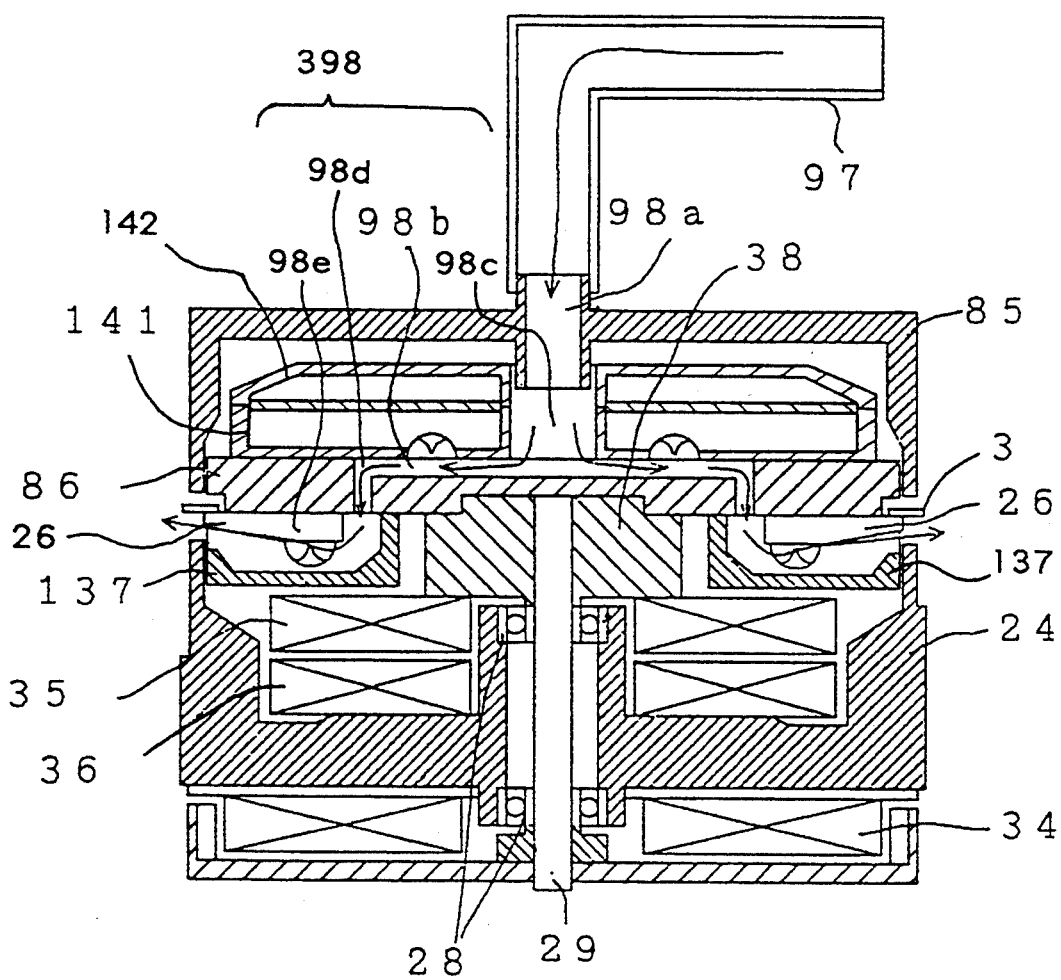
FIG. 27 is a sectional view of a rotary head device in the sixth embodiment of the present invention.

In the rotary head device shown in FIG. 27, the upper stationary drum 85 is formed with a first air circulation passage 98a which is in the shape of a pipe and which serves to connect the drum 85 with the pipe 97 coupled to the compressor 101. The middle rotary drum 86 is formed with a second air circulation passage 398. One end of the first air circulation passage 98a is mated with one end of the second air circulation passage 398. Herein, the mated ends of the passages 98a and 398 are held in opposition to each other with a small amount of play, to the extent that the middle rotary drum 86 is allowed to rotate.

The second air circulation passage 398 of the middle rotary drum 86 consists of circulation passages 98b, 98c, 98d and 98e. The circulation passage 98c is formed extending in the direction of the rotary shaft 29, and it is defined by shield covers 141 and 142 mounted on the middle rotary drum 86. Each of the circulation passages 98b is continuous to the circulation passage 98c, and it is located between the middle rotary drum 86 and the shield member 141 so as to extend radially of the plane of rotation of the middle rotary drum 86. In addition, each of the circulation passages 98d is continuous to the corresponding circulation passage 98b, and it penetrates the middle rotary drum 86 in the axial direction thereof. Further, each of the circulation passages 98e is defined by that surface of the middle rotary drum 86 which is close to the lower stationary drum 24, and an air control member 137 which is provided so as to cover a head base 26. Numeral 34 in FIG. 27 designates the coil of a motor for rotating the rotary shaft 29. The rest of the construction is the same as in FIG. 23, and shall not be repetitiously explained.

The first air circulation passage 98a axially introduces the compressed air supplied through the pipe 97, and delivers it to the second air circulation passage 398. The circulation passage 98c of the second air circulation passage 398 further introduces the compressed air in the axial direction of the rotary head device. Subsequently, the circulation passages 98b introduce the air in the radial direction of the rotary head device at the upper surface of the middle rotary drum 86. Thereafter, the circulation passages 98d introduce the air to the lower surface of the middle rotary drum 86. Finally, the circulation passages 98e introduce the air to the vicinities of the heads 3a etc. so as to spout it from these vicinities.

Figure 33A:
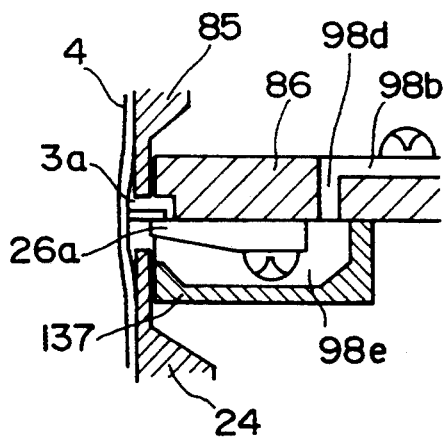
FIGS. 33A and 33B are fragmentary sectional views of the rotary head device illustrated in FIG. 27.
Figure 33B:
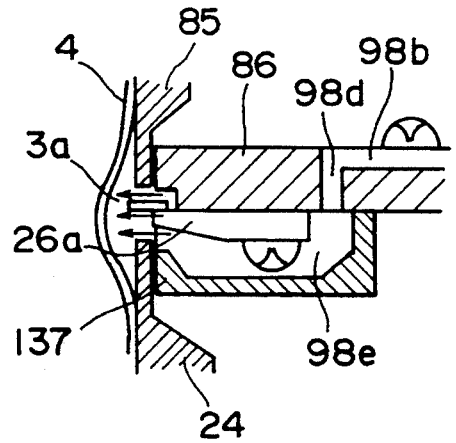
Figure 34A:
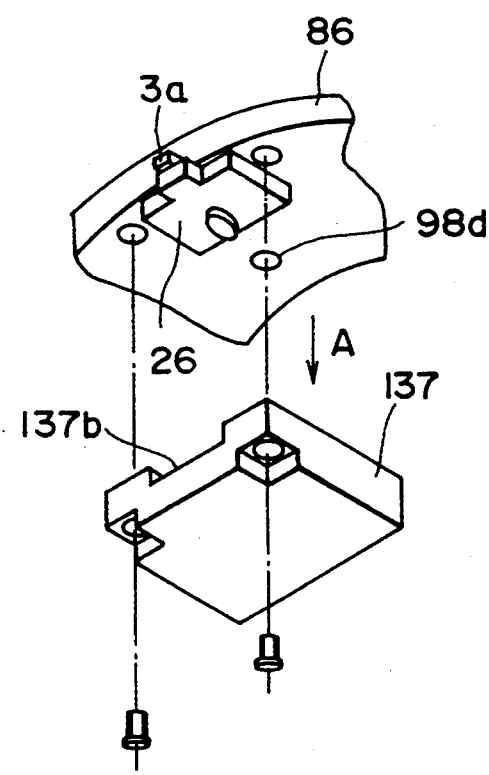
FIG. 34A is an explanatory view showing the mounting position of a box-shaped member (137) which is included in the rotary head device illustrated in FIG. 27.
Figure 34B:
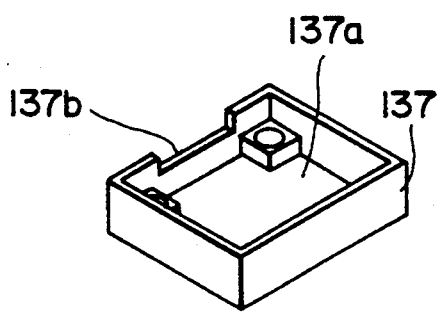
FIG. 34B is a perspective view of the box-shaped member (137) illustrated in FIG. 34A.
Figure 35:
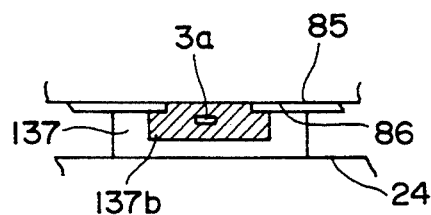
FIG. 35 is a front view of a head (3a) which is included in the rotary head device illustrated in FIG. 27.

Each of the air control members 137 will be detailed with reference to FIGS. 33A and 33B, FIGS. 34A and 34B, and FIG. 35. FIG. 33A and FIG. 33B are sectional views showing the vicinity of the head 3a in the state in which the air is spouted and in the state in which it is not spouted, respectively. FIG. 34B is a perspective view of the air control member 137 which is seen in a direction A indicated in an exploded perspective view of FIG. 34A. FIG. 35 is a schematic view for explaining the operation of the air control member 137. As shown in FIGS. 33A and 33B and FIGS. 34A and 34B, the air control member 137 is a box-shaped member which is arranged so as to surround the head base 26a. It is provided with an air outflow recess 137b in the vicinity of the corresponding head (3a in the illustration).

The air control member 137 is fixed to the middle rotary drum 86 by screwing or bonding. The circulation passage 98e is formed between the head base 26a and the air control member 137 and between the middle rotary drum 86 and the same member 137. The compressed air having passed through the circulation passages 98b and 98d flows through the circulation passage 98e, whereupon it is spouted from the air outflow recess 137b toward the tape 4 in the vicinity of the head 3a. On this occasion, owing to the extension of the circulation passage 98e in the radial direction of the plane of rotation of the middle rotary drum 86, the compressed air is spouted in parallel with the aforementioned plane of rotation and is blown perpendicularly to the surface of the tape 4. A hatched part in FIG. 35 indicates the part through which the air is spouted. Herein, the direction of the spouting of the air is substantially outwards from the sheet of the drawing.

According to this embodiment, the air is spouted in the direction parallel to the plane of rotation of the middle rotary drum 86, whereby the tape 4 can be effectively separated or floated from the head 3a to raise the tape floating efficiency.

Besides, according to this embodiment, increase in the number of magnetic heads can be coped with by merely increasing the number of air control members 137. Moreover, since the design of the air control member 137 is versatile, the velocity of the spouting of the air can be increased by, for example, reducing the area of the air outflow recess 137b shown in FIG. 35.

By the way, when the air control members 137 are made of an electrically-conductive material or a resin or the like coated with an electrically-conductive substance, leakage fluxes from the heads 3a etc. can be reduced, and also crosstalk to the other heads 3a etc. can be reduced.

Further, the air control members 137 can be mounted in the upper rotary drum 23 of the first embodiment shown in FIG. 6.

In the rotary head device shown in FIG. 27, the air circulation passage 98a on the side of the upper stationary drum 85 and the circulation passage 98c on the side of the middle rotary drum 86 are held in opposition so as to overlap each other with a sufficient amount of play. Thus, the air circulation passage 98a being stationary and the circulation passage 98c being rotary are mated while the air is prevented from leaking. In this regard, as the overlap between the two circulation passages 98a and 98c is longer, the amount of the air leakage becomes smaller at the joint between the stationary portion 85 and the rotary portion 142, and a satisfactory air pressure for floating the tape 4 can be attained more efficiently.

Figure 28:
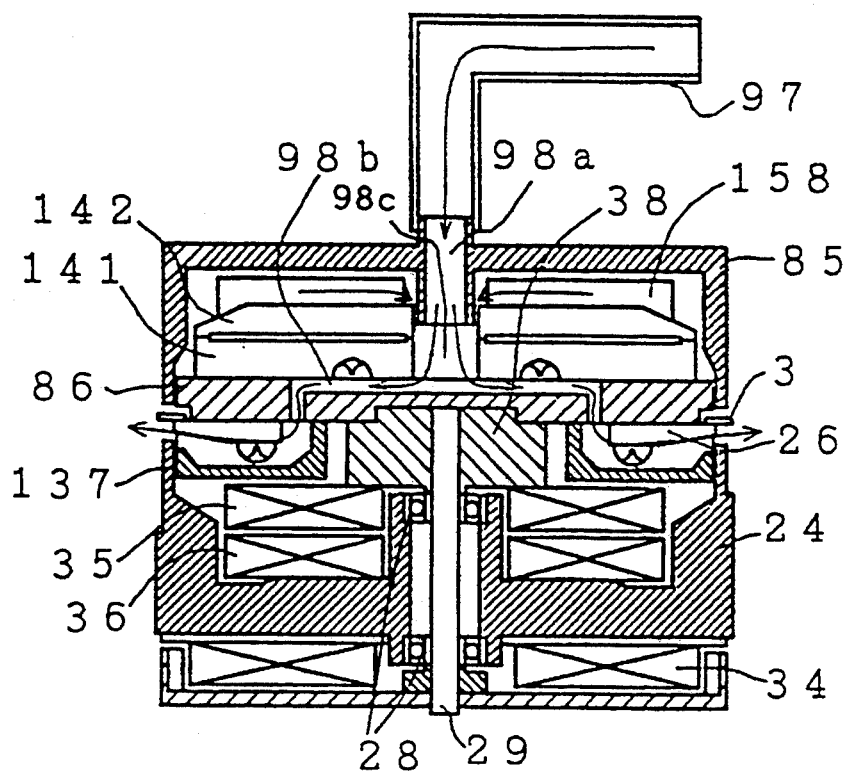
FIG. 28 is a sectional view of a modified embodiment in which the rotary head device illustrated in FIG. 27 is furnished with a fan (158)
Figure 29:
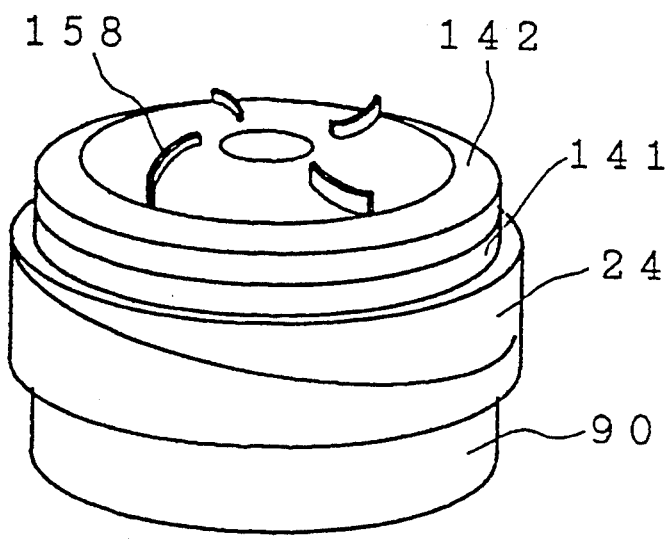
FIG. 29 is a perspective view showing the fan (158) and shield covers (141 and 142) which are illustrated in FIG. 28.

As another contrivance, in a case where a fan 158 having spiral blades is mounted on the shield cover 142 as illustrated in FIGS. 28 and 29, the air leakage through the joint can be further reduced. FIG. 28 shows a sectional view of the rotary head device, while FIG. 29 shows a perspective view of the upper stationary drum 85 of the rotary head device in a detached state. In the illustrated case, when the fan 158 having the spiral blades rotates together with the middle rotary drum 86, the dynamic pressure of the part of the fan 158 near to the circulation passages 98a and 98c of the rotary drum device becomes higher than that of the circumferential part of the fan 158. Consequently, the difference between the dynamic pressure of the interior of the circulation passages 98a and 98c and that of the interior of the rotary head device decreases to prevent air leakage.

Embodiment 7

Figure 30:
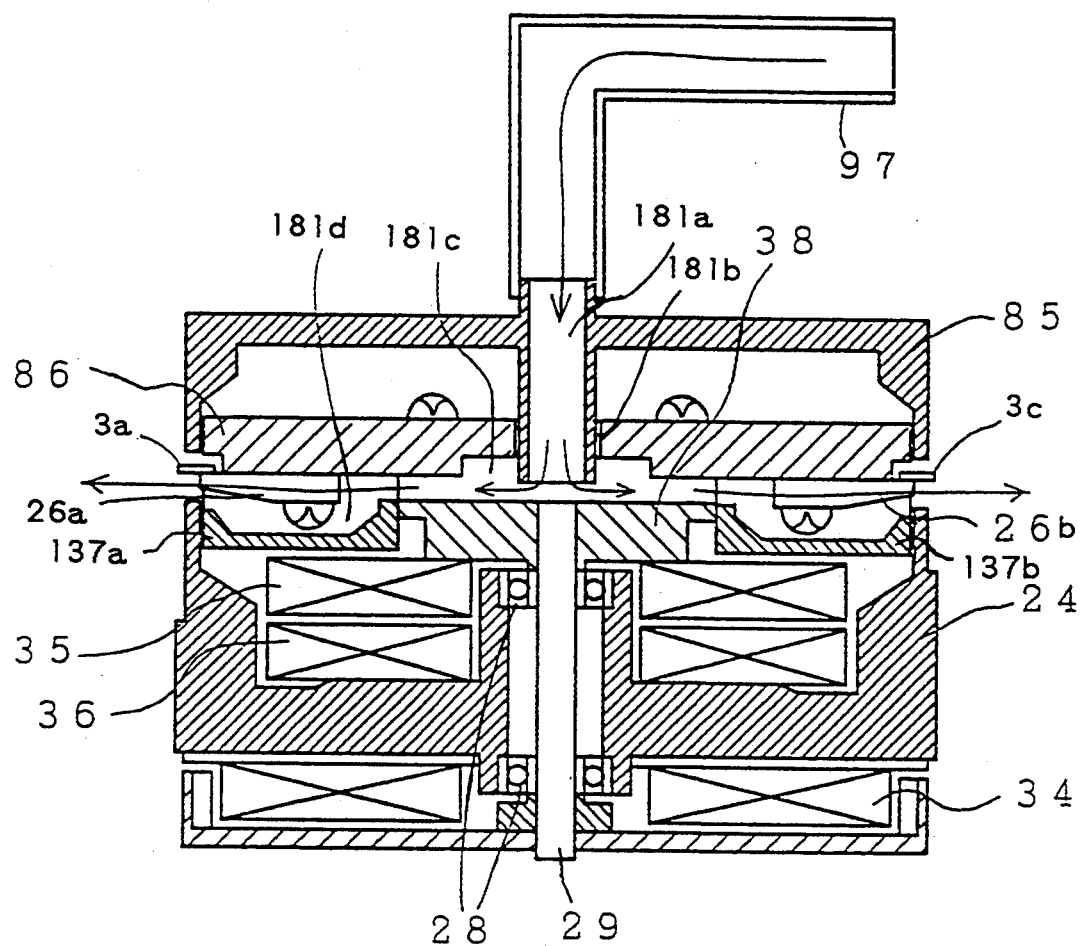
FIG. 30 is a sectional view of a rotary head device of the type having upper and lower stationary drums, in the seventh embodiment of the present invention.

Now, still another embodiment of the rotary head device of the type having the upper and lower stationary drums will be described with reference to FIG. 30.

In this embodiment the intermediate bent parts of an air circulation passage inside the rotary head device are removed, thereby lessening the loss of air circulation. That is, the loss of air supplied from a pipe 97 is reduced to the utmost, and the air is led to heads 3a etc. in one stroke, thereby increasing the pressure of the air which is spouted from the vicinities of the heads 3a etc.

In this embodiment, an upper stationary drum 85 is provided with an air circulation passage 181a, which is inserted, with a small amount of play, into a through-hole-like circulation passage 181b provided in a middle rotary drum 86. In addition, a disk 38 is provided with circulation passages 181c which communicate with the circulation passage 181a. The circulation passages 181c are extended in the radial direction of the plane of rotation of the middle rotary drum 86. These circulation passages 181c are respectively continuous to circulation passages 181d which are defined by air control members 137a etc. They are respectively surrounded with flutes provided in the disk 38 and the lower surface of the middle rotary drum 86.

The compressed air injected from the pipe 97 is introduced down to the level of the heads 3a etc. in the axial direction of the rotary head device in one stroke by the circulation passage 181a, from which it is led to the heads 3a etc. by the circulation passages 181c and 181d. Owing to this construction, the air circulation passage of the middle rotary drum 86 is bent at only one part, which is the minimum possible number of bends, in correspondence with each head. Therefore, the air flows smoothly, and the pressure of the air to be spouted can be increased.

Moreover, since the circulation passages 181c and 181d extend radially of the plane of rotation of the middle rotary drum 86, the compressed air is spouted from the vicinities of the heads 3a etc. in the radial direction of the plane of rotation of the middle rotary drum 86, that is, it is spouted in directions perpendicular to the surface of a magnetic tape 4. Therefore, the parts of the tape 4 vicinal to the heads 3a etc. can be efficiently floated.

Embodiment 8

Now, a recording/playback apparatus in the eighth embodiment of the present invention will be described with reference to FIGS. 36, 37 and 38.

Although the magnetic recording/playback apparatus of this embodiment comprises the same recording/playback mechanism assembly 2 as in the magnetic recording/playback apparatus of the first embodiment, it controls the recording/playback mechanism assembly 2 by a control method which is different from that of the first embodiment. Concretely, in the magnetic recording/playback apparatus of this embodiment, whether or not the magnetic heads 3a, 3b, 3c and 3d are in contact with the magnetic tape 4 is judged from the levels of the played-back signals of the heads 3a etc., whereupon the tension of the tape 4 and the pressure of the air to be injected from the pressure control means 11 are controlled.

Figure 36:
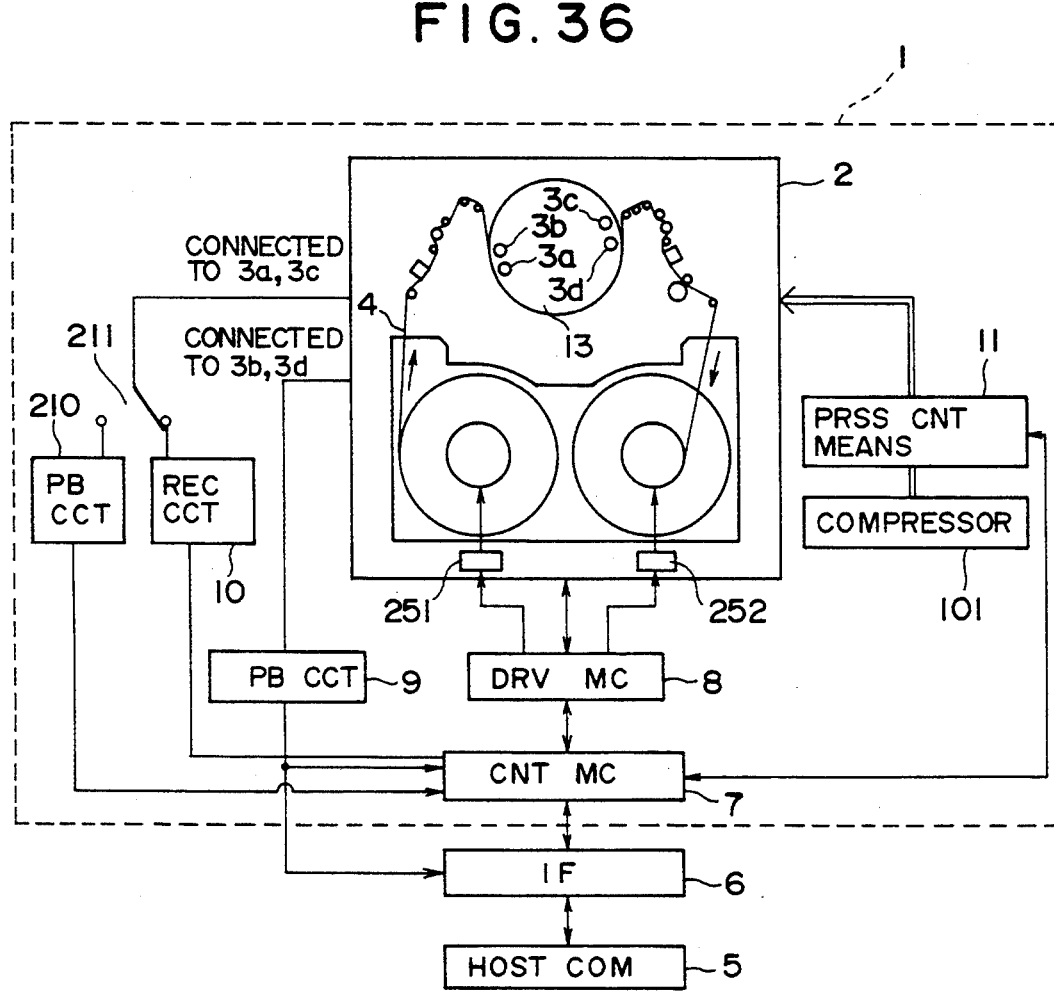
FIG. 36 is a block diagram showing the construction of a recording/playback apparatus in the eighth embodiment of the present invention.

As illustrated in FIG. 36, the magnetic recording/playback apparatus of this embodiment has a construction which is very similar to that of the magnetic recording/playback apparatus of the first embodiment illustrated in FIG. 1. However, it further comprises a playback circuit 210 for detecting the playback outputs of the recording heads 3a and 3c. The playback circuit 210 is connected to the control microcomputer 7. In addition, a switching circuit 211 is interposed between the heads 3a, 3c and the playback circuit 210 as well as the recording circuit 10. The control microcomputer 7 connects either of the playback circuit 210 or the recording circuit 10 to the heads 3a, 3c via switching circuit 211.

Besides, the pressure control means 11 in this embodiment can continuously regulate the intensity of the air pressure. Further, the feed side reel motor 251 of the recording/playback mechanism assembly 2 can continuously regulate its speed of revolution.

In the R. STOP mode of the operation of the apparatus, the control microcomputer 7 receives the played-back signals of the heads 3a, 3c and the heads 3b, 3d from the playback circuit 210 and the playback circuit 9, respectively. Then, it decides whether the heads 3a~3d are in contact with the tape 4, from the levels of the received signals. Subsequently, it gives the command of the injection pressure to the pressure control means 11 in accordance with the results of the decision. In addition, using the decided results, the control microcomputer 7 controls the back torque of the feed side reel motor 251 of the recording/playback mechanism assembly 2, thereby regulating the tension of the tape 4.

Figure 37:
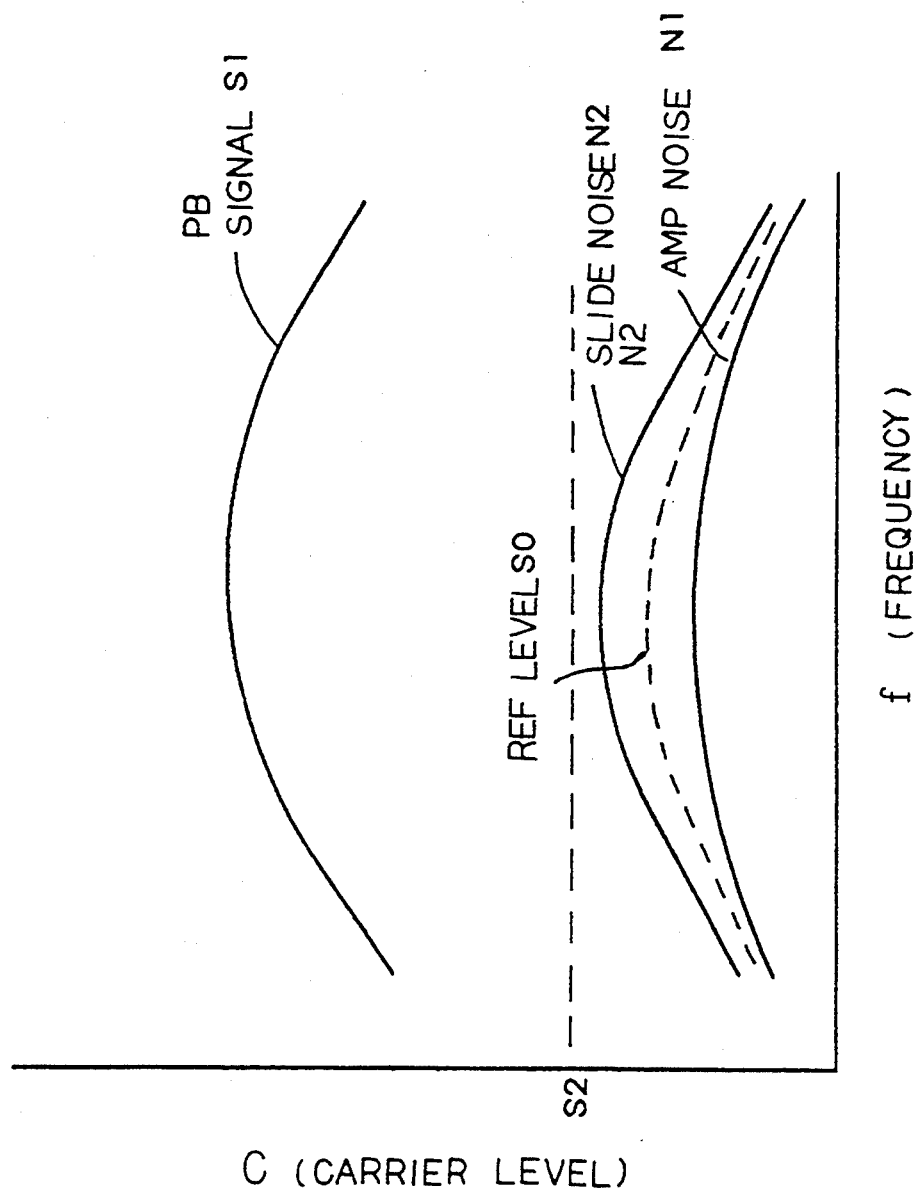
FIG. 37 is a graph showing the frequencies and output levels of signals which are detected from a head (3a) etc. in the recording/playback apparatus illustrated in FIG. 36.

Reference will now be made to FIG. 37 to explain a method of deciding whether or not each of the heads 3a~3d lies in contact with the tape 4, on the basis of the playback signal level detected from the corresponding head. This figure illustrates the relationships between the level of the played-back signal of each of the heads 3a~3d, etc. and the frequencies thereof, in the case where a preamplifier for amplifying the played-back signal is connected to each of the heads 3a~3d. Amplifier noise N1 is detected from each head without regard to the contact or noncontact between the tape 4 and the corresponding head. The amplifier noise N1 exhibits the lowest level in the output signal of each head. Next, when each of the heads 3a~3d and the tape 4 on which no signal is recorded slide in contact, slide noise N2 is detected. Further, when each of the heads 3a~3d and the tape 4 on which a signal is recorded come into contact, the played-back signal S1 is detected. The detection level of the played-back signal S1 is sufficiently high relative to that of each of the amplifier noise N1 and the slide noise N2. It is to be understood that, when the level of the playback output of each of the heads 3a~3d is intermediate between the levels of the amplifier noise N1 and slide noise N2, the corresponding head lies out of contact with the tape 4.

Accordingly, the control microcomputer 7 can decide whether or not each of the heads 3a~3d lies in contact with the tape 4, by checking the level of the signal detected from the corresponding head. In the R. STOP mode, the heads 3a~3d and the tape 4 are brought into the noncontact states in such a way that, using the decided results, the air is injected until each of the levels of the output signals of the heads 3a~3d becomes the intermediate level (a reference level S0) which is higher than the level of the amplifier noise N1 and lower than the level of the slide noise N2.

The control operation of the control microcomputer 7 will be explained with reference to FIG. 38.

In a case where the control microcomputer 7 commands the drive microcomputer 8 to bring the recording/playback mechanism assembly 2 into the R. STOP mode, it simultaneously commands the pressure control means 11 to supply the air into the rotary head device 13 under a preset pressure P1 (step 501). The pressure control means 11 operates to supply the air into the rotary head device 13 through a supply pipe (such as the nozzle 39) under the supply air pressure P1, and the rotary head device 13 operates to spout the air from the vicinities of the heads 3a~3d toward the tape 4.

Subsequently, the control microcomputer 7 changes-over the switching circuit 211 to the side of the playback circuit 210. Then, it receives the played-back signals of the heads 3a, 3c and the heads 3b, 3d from the respective playback circuits 210 and 9 so as to detect the levels S of the received signals (step 502). The predetermined signal level S0 (as indicated in FIG. 37) is stored in the internal memory of the control microcomputer 7. The signal level S0 is set by conducting an experiment beforehand, and it has a value greater than the amplifier noise N1 and smaller than the slide noise N2. The control microcomputer 7 compares each of the levels S with the reference level S0, and it decides that the tape 4 and the corresponding head are in contact, subject to S>S0 (step 503). On this occasion, the control microcomputer 7 commands the pressure control means 11 to raise the supply air pressure (step 504). Thereafter, the routine returns to the step 502 so as to iterate the steps 502, 503 and 504 until all the played-back signals of the heads 3a, 3b, 3c and 3d satisfy a condition $S \leq S0$ at the step 503. Here, since the reference level S0 is set smaller than the slide noise N2, the noncontact state between the tape 4 and each of the heads 3a etc. can be verified by the condition $S \leq S0$. Until the R. STOP mode is shifted to the next operating mode of the apparatus, the noncontact states between the tape 4 and the heads 3a etc. are held by keeping the supply air pressure P1 and the tape tension stable. It is accordingly possible to prevent the heads 3a etc. from wearing away and the tape 4 from becoming damaged.

The pressures under which the tape 4 is in contact with the individual heads 3a, 3b, 3c and 3d, disperse due to errors in the protruding magnitudes of the heads 3a etc. mounted on the upper rotary drum 23, and discrepancies in the shapes of the tips of the heads 3a etc. It can therefore take place, by way of example, that, in spite of the noncontact of the head 3a with the tape 4, the head 3d is in contact with the tape 4. Since this embodiment can separately judge the contact or noncontact with the tape 4 for each of the heads 3a, 3b, 3c and 3d, it can reliably separate or float the tape 4 from all the heads 3a etc.

Now, another example of the control method of the control microcomputer 7 will be explained with reference to FIG. 39.

In a case where the control microcomputer 7 commands the drive microcomputer 8 to bring the recording/playback mechanism assembly 2 into the R. STOP mode, it simultaneously commands the pressure control means 11 to supply the air into the rotary head device 13 under a preset pressure P1 (step 511). The pressure control means 11 operates to supply the air into the rotary head device 13 through the supply pipe under the supply air pressure P1, and the rotary head device 13 operates to spout the air from the vicinities of the heads $3a \sim 3d$ toward the tape 4.

Subsequently, the control microcomputer 7 changes-over the switching circuit 211 to the side of the playback circuit 210. Then, it receives the played-back signals of the heads 3a, 3c and the heads 3b, 3d from the respective playback circuits 210 and 9 so as to detect the levels S of the received signals (step 512). The predetermined signal level S0 (as indicated in FIG. 37) is stored in the internal memory of the control microcomputer 7. The signal level S0 is set by conducting an experiment beforehand, and it has a value greater than the amplifier noise N1 and smaller than the slide noise N2. The control microcomputer 7 compares each of the levels S with the reference level S0, and it decides that the tape 4 and the corresponding head are in contact if subject to $S > S0$ (step 513). On this occasion, the control microcomputer 7 commands the drive microcomputer 8 to weaken the tension of the tape 4 (step 514). Thus, the drive microcomputer 8 controls the back torque of the feed reel motor 251 so as to relax the tape tension. Thereafter, the routine returns to the step 512 so as to iterate the steps 512, 513 and 514 until all the played-back signals of the heads 3a, 3b, 3c and 3d satisfy a condition $S \leq S0$ at the step 513. Here, since the reference level S0 is set smaller than the slide noise N2, the noncontact state between the tape 4 and each of the heads 3a etc. can be verified by the condition $S \leq S0$. Until the R. STOP mode is shifted to the next operating mode of the apparatus, the noncontact state between the tape 4 and the heads 3a etc. is held by keeping the supply air pressure P1 and the tape tension stable. It is accordingly possible to prevent the heads 3a etc. from wearing away and the tape 4 from becoming damaged.

Now, still another example of the control operation of the control microcomputer 7 will be explained with reference to FIG. 40.

Figure 39:
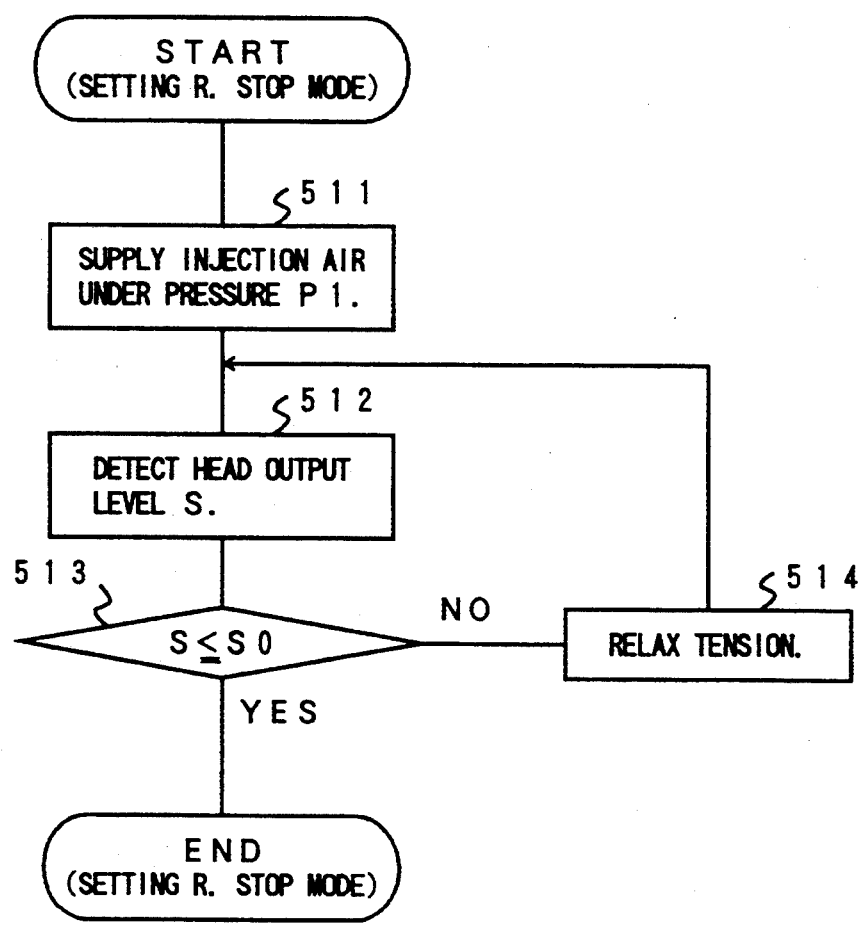
FIG. 39 is a flow chart showing another example of the control operation of a control system illustrated in FIG. 36.
Figure 40:
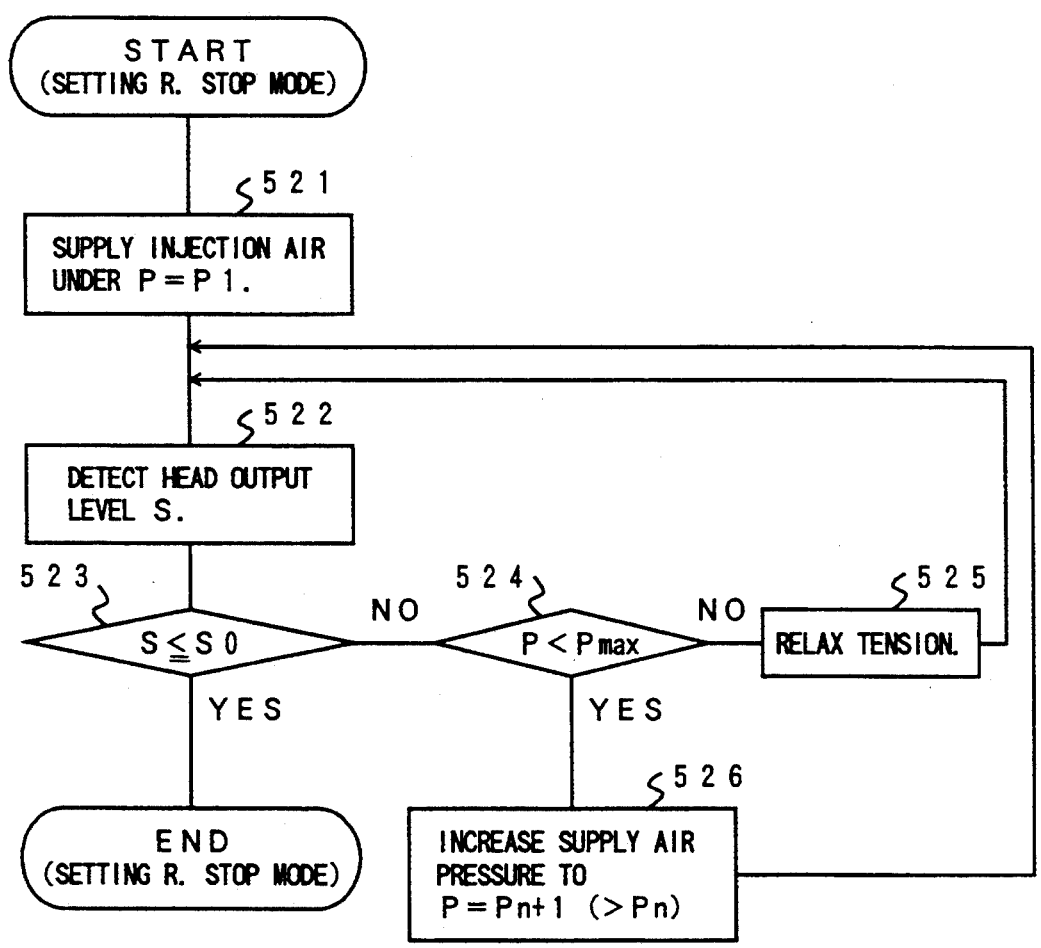
FIG. 40 is a flow chart showing still another example of the control operation of the control system illustrated in FIG. 36.

The control operation illustrated in FIG. 40 separates or floats the tape 4 from the heads $3a \sim 3d$ by a tape tension control and a supply air pressure control. The upper-limit value Pmax of the pressure of the air to be supplied is set for the pressure control means 11 from the viewpoints of the size, noise, power consumption etc. of the recording/playback apparatus as a system. In a case where the control microcomputer 7 commands the drive microcomputer 8 to bring the recording/playback mechanism assembly 2 into the R. STOP mode, it simultaneously commands the pressure control means 11 to supply the air into the rotary head device 13 under a preset pressure P1 (step 521). Thus, the air is spouted from the vicinities of the heads 3a etc. of the rotary head device 13 toward the tape 4. In this state, the control microcomputer 7 estimates the contact state between the tape 4 and each of the heads 3a etc. on the basis of the detection signals of the corresponding head in the same manner as at the steps 502 and 503 in FIG. 38 (steps 522 and 523). Upon deciding that the tape 4 and the corresponding head lie in contact, the control microcomputer 7 commands the pressure control means 11 to increase the air supply pressure till the establishment of the noncontact state between the corresponding head and the tape 4 or up to the upper-limit value Pmax (steps 524 and 526), whereupon the routine returns to the step 522. In a case where, at the step 524, the control microcomputer 7 has decided that there is still contact between the tape 4 and the corresponding head in spite of the increase of the supply air pressure to the upper-limit value Pmax, it commands the drive microcomputer 8 to control the back torque of the feed reel motor 251 so as to relax the tension of the tape 4 (step 525), in the same manner as at the step 514 in FIG. 39. Thus, the tape tension is weakened until the tape 4 and all the heads 3a etc. fall into the noncontact states.

In this way, even in the case where the pressure of the air to be supplied by the pressure control means 11 is limited by the operating limit of the compressor 101 or pressure control means 11 and/or due to the noise, power consumption etc. of the recording/playback apparatus, the tape 4 can be completely separated or floated from the heads 3a etc. Accordingly, the tape 4 and the heads 3a etc. can be brought into the noncontact states effectively by a low supply air pressure. It is therefore possible to realize a reduction in the size of the compressor 101 and a lowering of the noise level and power consumption of the apparatus.

In the example shown in FIG. 40, the pressure control means 11 and the feed reel motor 251 are controlled so as to bring the tape 4 and the heads 3a etc. into the noncontact states by relaxing the tape tension after the air supply pressure has been increased up to the upper-limit value Pmax. However, the same effect is attained even in a case where the lower-limit value of the tape tension is set beforehand and where the air supply pressure is increased after the tension has been relaxed down to the lower-limit value.

In this embodiment, the step 502, 512 or 522 detects the contact pressure on the tape 4, using the level of the played-back signal of each of the heads 3a etc. Herein, in the case where the tape 4 bears no signal, the slide noise N2 (indicated in FIG. 37) is output from the corresponding head, and it is compared with the reference level S0. Since, however, the difference between the levels N2 and S0 is very small as seen from FIG. 37, the comparison is difficult. This difficulty can be overcome by an expedient illustrated in FIG. 43. More specifically, in the case where the contact pressure is to be detected at the part of the tape 4 bearing no signal, a dummy signal for the detection is recorded beforehand, and the playback output of the dummy signal is used for the control.

This expedient will be detailed with reference to FIG. 43. A control operation for recording the dummy signal precedes the step 511 in the control operation shown in FIG. 39. A signal level S2 evaluated experimentally is stored in the control microcomputer 7 beforehand. The signal level S2 is lower than the level of the played-back signal S1 and is higher than the level of the slide noise N2. In a case where the signal level S2 is set near the level of the played-back signal S1, the signal S1 of low level written in the tape 4 might be misjudged as being unwritten or nonexistent. In the illustrated example, therefore, the signal level S2 is set near the slide noise level N2.

Before commanding the drive microcomputer 8 to establish the R. STOP mode, the control microcomputer 7 receives each of the played-back signals of the heads 3a~3d through the corresponding playback circuit 9 or 210 (step 531). When S<S2 holds at a step 532, it is decided that the tape 4 bears no signal. Then, the routine proceeds to a step 533, at which the dummy signal is recorded on the tape 4 through the recording circuit 10. Thereafter, the control microcomputer 7 commands the drive microcomputer 8 to set the R. STOP mode (step 534). Subsequently, the same steps as those 511 thru 514 shown in FIG. 39 are performed. At the step 512, the played-back dummy signal is detected. On the other hand, when S<S2 does not hold at the step 532, this step is directly followed by the step 534.

In a case of ending the R. STOP mode, the control microcomputer 7 commands the pressure control means 11 to stop the injection of the air and simultaneously commands the drive microcomputer 8 to control the feed reel motor 251 so as to recover the tension of the tape 4 (step 535). Thus, the tape 4 comes into contact with the heads 3a etc. Further, the dummy signal recorded at the step 533 is erased by a flying erase head (not shown) mounted in the rotary head device 13 (step 536). Then, the R. STOP mode is ended.

Figure 43:
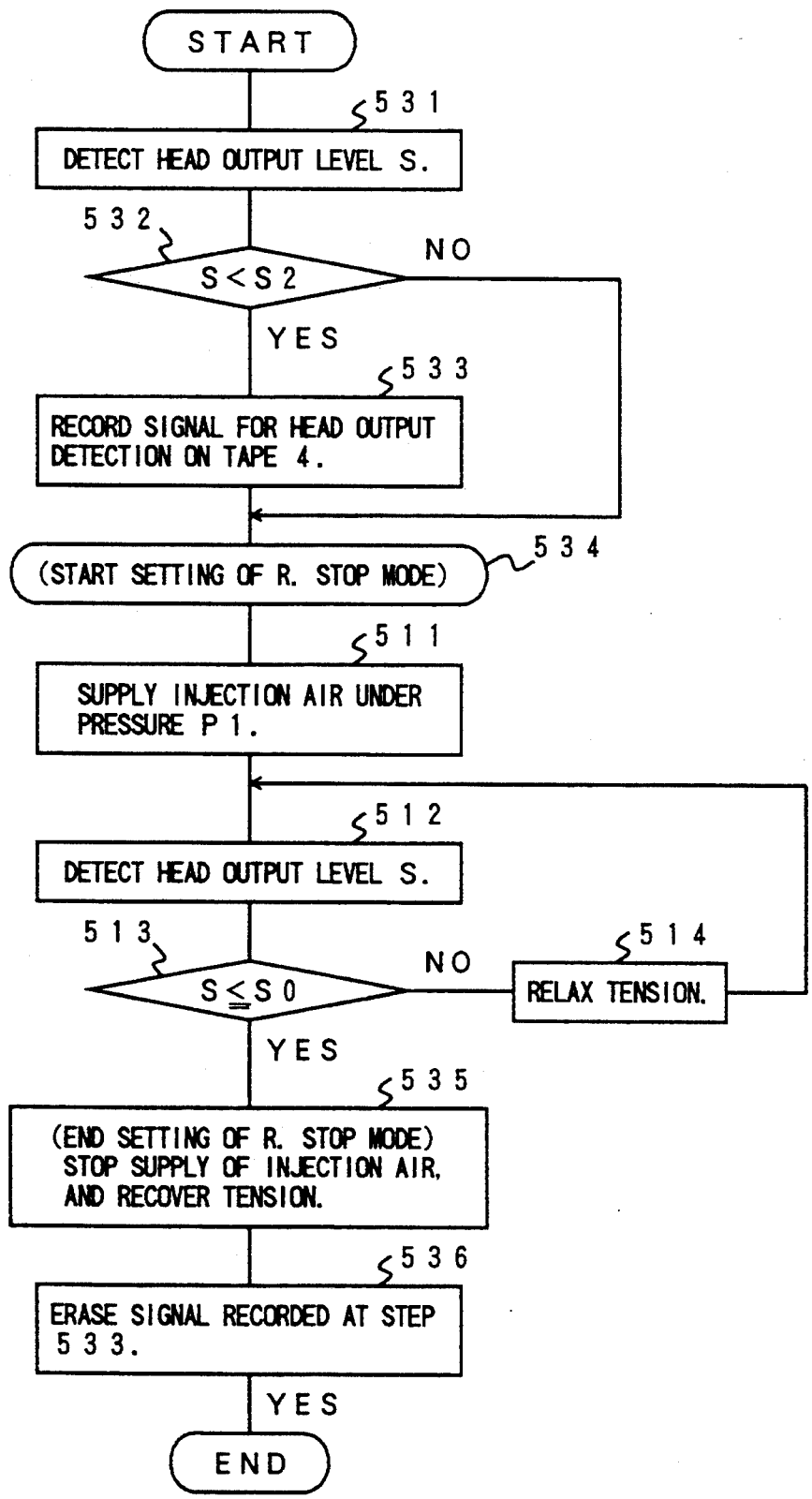
FIG. 43 is a flow chart showing a control operation in the recording/playback apparatus illustrated in FIG. 41.

In this way, owing to the control operation shown in FIG. 43, whether or not the heads 3a etc. and the tape 4 lie in contact can be precisely judged in the R. STOP mode irrespective of whether or not the signal to be played back is recorded on the tape 4 wound round the rotary head device 13. It is accordingly possible to separate the tape 4 from the heads 3a etc. completely and reliably.

By the way, the output level S of the corresponding one of the heads 3a etc. is compared with the reference level S0 at the step 513 of the control operation shown in FIG. 43. At this step, the output level S may well be compared with the reference level S2.

Figure 38:
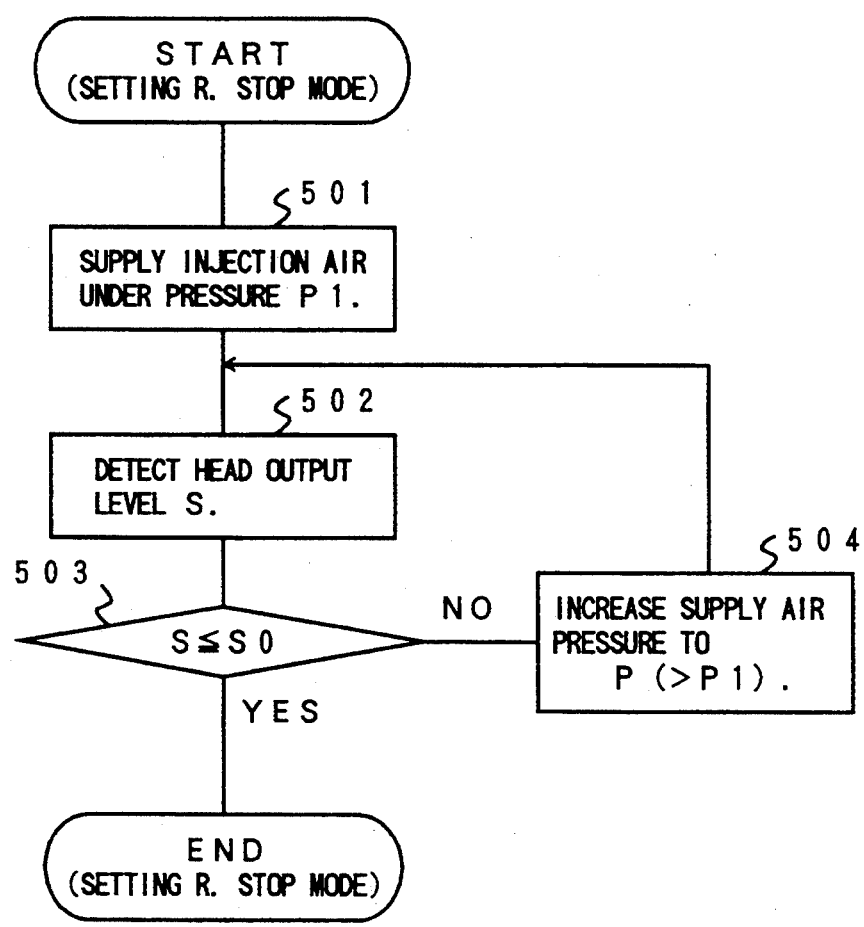
FIG. 38 is a flow chart showing a control operation in the recording/playback apparatus illustrated in FIG. 36.

Besides, in each of the control operations shown in FIGS. 38, 39 and 40, the control for completely separating the tape 4 from the heads 3a etc. is performed, but no control is performed as to a case where the tape 4 has been excessively separated or floated from the heads 3a etc. When the tape 4 has been excessively separated from the heads 3a etc., it might come off the tape guides of the recording/playback mechanism assembly 2 or might flutter. Therefore, means for preventing the tape 4 from being excessively separated from the heads 3a etc. is further provided in a recording/playback apparatus which is illustrated in FIG. 41, FIGS. 42A and 42B, and FIG. 44.

Figure 41:
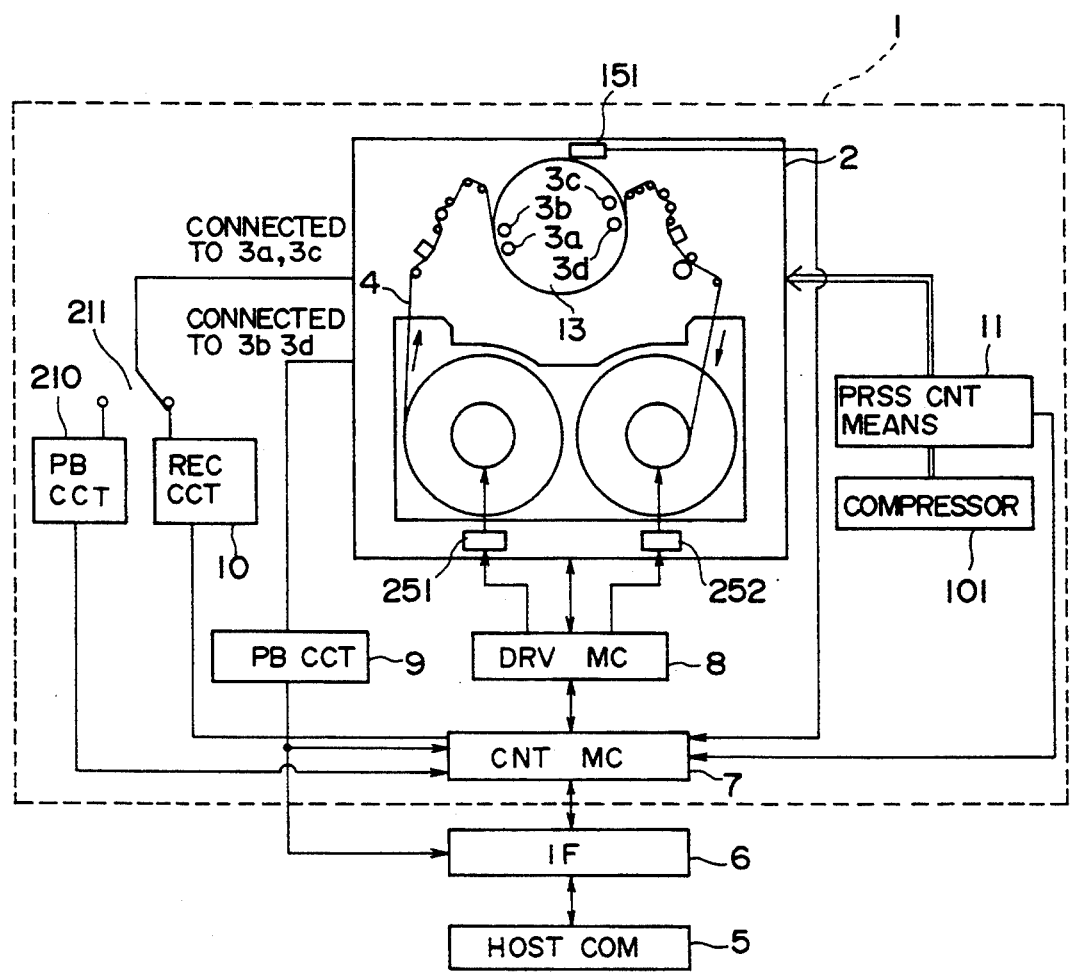
FIG. 41 is a block diagram showing the construction of a modified embodiment which has improved the recording/playback apparatus illustrated in FIG. 36.

The recording/playback apparatus shown in FIG. 41 is such that the rotary head device 13 of the recording/playback apparatus shown in FIG. 36 is further furnished with a pressure sensor 151 which detects the pressure of the air in the air circulation passage 98 of the rotary head device 13. After the control microcomputer 7 has executed the control operation in FIG. 38, FIG. 39 or FIG. 40 to separate the tape 4 from the heads 3a etc., it also executes the control for preventing the excessive separation of the tape 4, by the use of the detected result of the pressure sensor 151.

Figure 44:
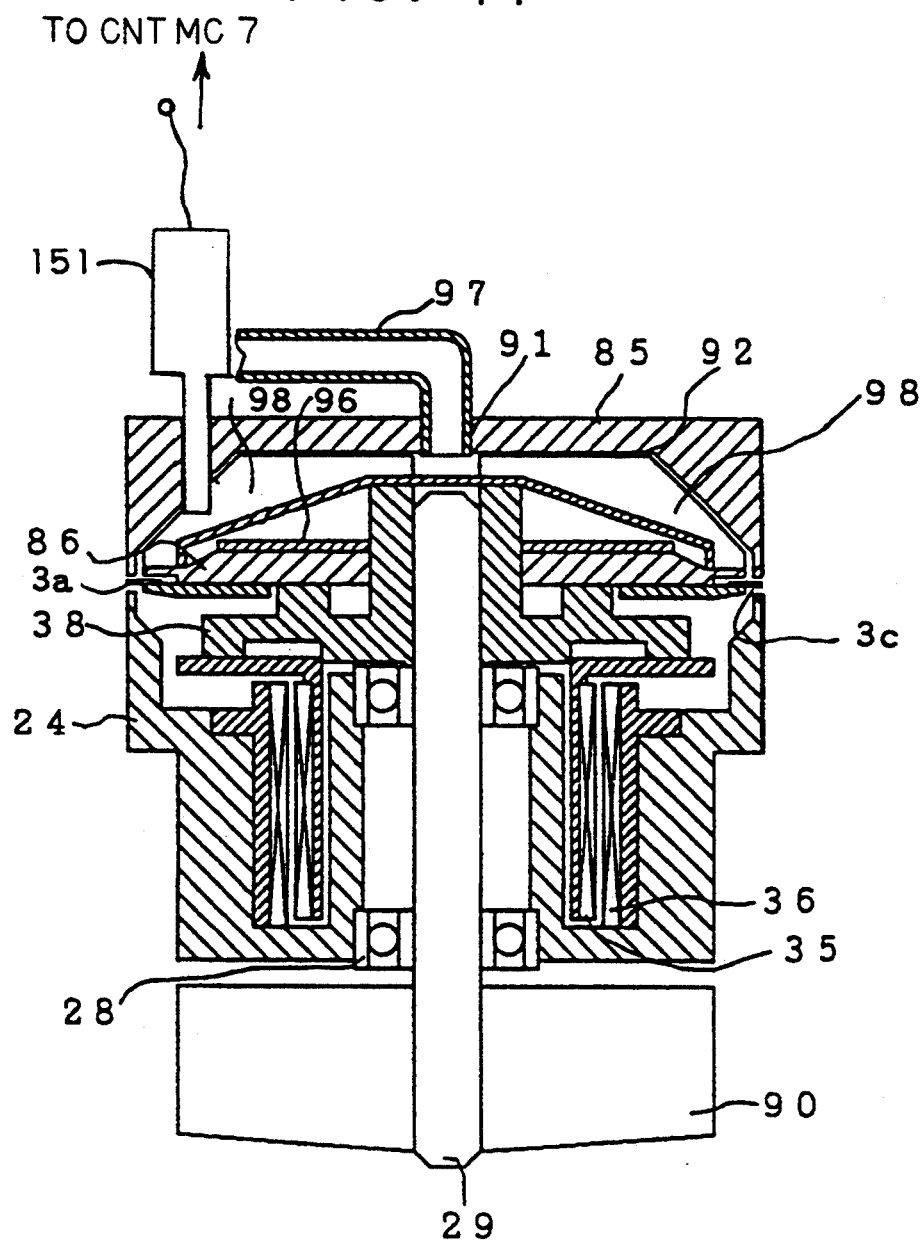
FIG. 44 is a sectional view showing the construction of a rotary head device which is included in the recording/playback apparatus illustrated in FIG. 41.

As shown in FIG. 44, the pressure sensor 151 is arranged in one of the air circulation passages 98 through a through hole which is provided in the upper stationary drum 85.

Figure 42A:
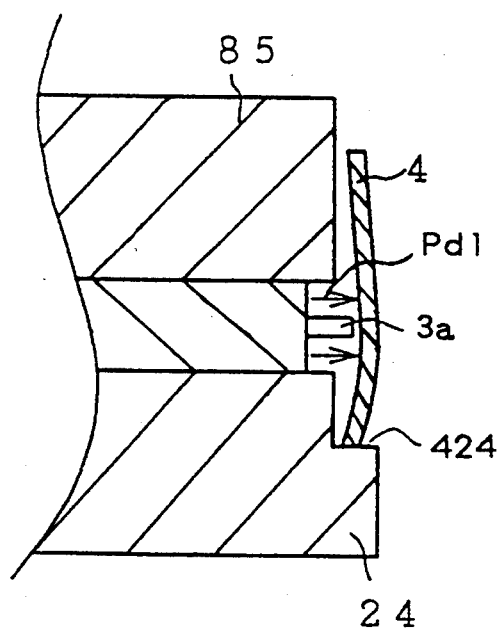
FIGS. 42A and 42B are fragmentary sectional views each showing the relationship between a magnetic tape and an air pressure within a rotary head device in the recording/playback apparatus illustrated in FIG. 36.
Figure 42B:
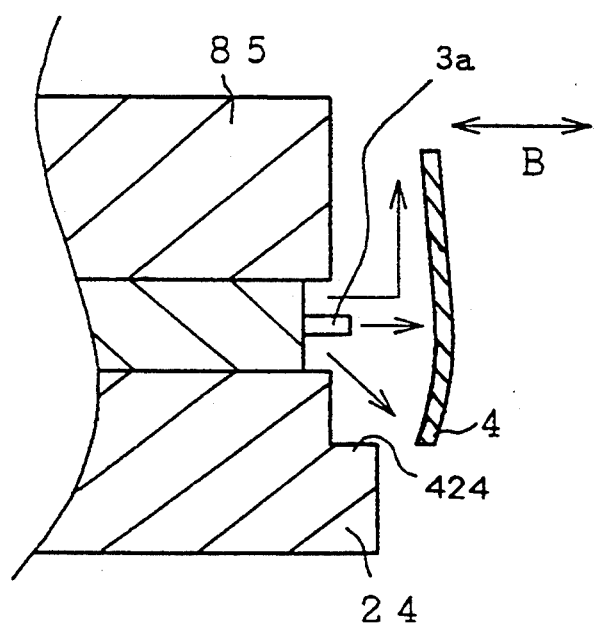

The relationship of the tape 4 with the pressure of the air inside the air circulation passage 98 is depicted in FIGS. 42A and 42B. As shown in FIG. 42A, when the pressure of the air in the rotary head device 13 is Pd1, the part of the tape 4 vicinal to each head (3a in the illustration) is separated from the head, but the other parts of the tape 4 are kept supported on the tape guide 424 of the lower stationary drum 24. Thus, the normal separation state is established. In contrast, when the pressure of the injection air is too high or when the tension of the tape 4 is too weak or low, the tape 4 falls into the state of FIG. 42B in which the separation or distance between the tape 4 and the head 3a becomes excessively large. In this case the tape 4 comes away from the tape guide 424 of the lower stationary drum 24, or it flutters. In such a state, the air leaks through the gap between the separated tape 4 and the head 3a, and the air pressure in the rotary head device 13 lowers abruptly to a value Pd2 (<Pd1). Moreover, in such a state, the tape 4 is likely to become damaged due to rubbing against the tape guide 424.

The pressure Pd1 under which the tape 4 falls into the state of FIG. 42A is set having a certain range, and it is stored in the internal memory of the control microcomputer 7 of the apparatus shown in FIG. 41. After the end of the control operation shown in FIG. 38, FIG. 39 or FIG. 40, the control microcomputer 7 receives the pressure in the circulation passage 98 of the rotary head device 13 from the pressure sensor 151. Subsequently, in a case where the received pressure is higher than the preset pressure Pd1, the control microcomputer 7 commands the drive microcomputer 8 to control the feed reel motor 251 so as to weaken the tension of the tape 4. On the other hand, in a case where the received pressure is lower than the preset pressure Pd1, the control microcomputer 7 commands the drive microcomputer 8 to intensify the tape tension, or it commands the pressure control means 11 to lower the injection pressure. The above control is iterated until the sensed pressure of the pressure sensor 151 falls within the range of the pressure Pd1.

Owing to such a control, the tape 4 and the heads 3a etc. can be held in the appropriate state as shown in FIG. 42A, without the excessive separation.

Incidentally, although each of the foregoing embodiments has referred to the magnetic recording/playback apparatus employing the cassette with the two built-in reels around which the magnetic tape is wound, the present invention is also applicable to a magnetic recording/playback apparatus employing a cassette with a single built-in reel around which a magnetic tape is wound. Insofar as a signal is recorded on and played back from a magnetic tape by the use of a rotary drum device, the type of the magnetic recording/playback apparatus is not especially restricted or specified.

Besides, as long as the rotary drum device can spout air from the vicinities of magnetic heads, the structure thereof is not especially restricted or specified.

As set forth above, according to the present invention, it is possible to provide a recording/playback apparatus which can prevent heads from wearing away and which can perform recording and playback operation immediately after standby.

What is claimed is:

1. A recording/playback apparatus, for recording and playing back data on and from a magnetic tape, comprising:
    a stationary drum including a cylindrical outer peripheral surface for winding the traveling tape thereon, a plurality of heads which record and play back the data on and from said tape rotary portion which is rotated about an axis of said stationary drum while carrying said heads thereon, and a drive portion which drives and rotates said rotary portion; and
    air injection means for spouting air from the vicinities of said heads outward of said rotary portion in order to separate said tape from said heads in a state in which at least part of said tape is wound on said stationary drum, said air injection means including (i) an air circulation passage which is formed with slots in the vicinities of the corresponding heads in order to introduce the air into the vicinities of said corresponding heads, (ii) parts continuous to the respective slots and formed of box-shaped members which are made of an electrically-conductive material, and each of which is mounted on said rotary portion so as to surround the corresponding head, and (iii) control means for controlling the starting and stopping of the air spouting of said air injection means.

2. A recording/playback apparatus, for recording and playing back data on and from a magnetic tape, comprising:
    a stationary drum including a cylindrical outer peripheral surface for winding the traveling tape thereon, a plurality of heads which record and play back the data on and from said tape, a rotary portion which is rotated about an axis of said stationary drum while carrying said heads thereon, and a drive portion which drives and rotates said rotary portion; and
    air injection means for spouting air from the vicinities of said heads outward of said rotary portion in order to separate said tape from said heads in a state in which at least part of said tape is wound on said stationary drum, said air injection means including:
    (a) a nozzle which injects air;
    (b) at least one duct which is mounted on said rotary drum, an air outlet of said duct being located in said vicinities of said heads, and an air inlet of said duct being located on a side thereof close to said nozzle, the cross-sectional area of said air outlet being smaller than that of said air inlet;
    (c) shutter means for shutting said air outlet of said duct in compliance with a command; and
    (d) control means for controlling the starting and stopping of the air spouting of said air injection means, said control means commanding said shutter means to open said air outlet in the case of causing said air injection means to start said air spouting and commanding said shutter means to shut said air outlet in the case of causing said air injection means to stop said air spouting.

3. A recording/playback apparatus, for recording and playing back data on and from a magnetic tape, comprising:
    a stationary drum including a cylindrical outer peripheral surface for winding the traveling tape thereon, a plurality of heads which record and play back the data on and from said tape, a rotary portion which is rotated about an axis of said stationary drum while carrying said heads thereon, a drive portion which drives and rotates said rotary portion, an upper drum portion and a lower drum portion which are coaxially arranged, said upper drum portion and said lower drum portion having their respective outer peripheral surfaces arranged at positions which adjoin each other through a clearance, with a space continuous to said clearance being defined inside said stationary drum, said rotary drum being arranged in said space, while said heads are located in said clearance; and
    air injection means for spouting air from vicinities of said heads outward of said rotary portion in order to separate said tape from said heads in a state in which at least part of said tape is wound on said stationary drum, said air injection means including (i) a first air circulation passage in said upper drum portion, (ii) a second air circulation passage in said rotary portion, and (iii) control means for controlling starting and stopping of the air spouting of said air injection means, said first air circulation passage extending along an axis of said upper drum portion, said second air circulation passage including openings which discharge air into the vicinities of the respective heads, said second air circulation passage being rotatably connected with said first air circulation passage, and wherein:
    a plurality of vanes are further mounted on said rotary portion; and
    said vanes push out air existing outside said first and second air circulation passages, toward a connection region between said second air circulation passage and said first air circulation passage when said rotary portion is rotated.

4. A recording/playback apparatus, for recording and playing back data on and from a magnetic tape, comprising:
    a stationary drum including cylindrical outer peripheral surface for winding the traveling tape thereon, a plurality of heads which record and play back the data on and from said tape, a rotary portion which is rotated about an axis of said stationary drum while carrying said heads thereon, a drive portion which drives and rotates said rotary portion, an upper drum portion and a lower drum portion which are coaxially arranged, said upper drum portion and said lower drum portion having their respective outer peripheral surfaces arranged at positions which adjoin each other through a clearance, with a space continuous to said clearance being defined inside said stationary drum, said rotary drum being arranged in said space, while said heads are located in said clearance;

air injection means for spouting air from vicinities of said heads outward of said rotary portion in order to separate said tape from said heads in a state in which at least part of said tape is wound on said stationary drum, said air injection means portion (i) a first air circulation passage in said upper drum portion, (ii) a second air circulation passage in said rotary portion, and (iii) control means for controlling starting and stopping of the air spouting of said air injection means, said first air circulation passage extending along an axis of said upper drum portion, said second air circulation passage including openings which discharge air into the vicinities of the respective heads, said second air circulation passage being rotatably connected with said first air circulation passage, and a leakage preventing member which prevents air from leaking through each of said openings when said each opening lies at that position of said stationary drum on which said tape is not wound.

5. A recording/playback apparatus as defined in claim 4, wherein said leakage preventing member is a member for covering said clearance at that outer peripheral surface part of said stationary drum on which said tape is not wound.

6. A recording/playback apparatus, for recording and playing back data on and from a magnetic tape comprising:

a stationary drum which includes a cylindrical outer peripheral surface for winding the traveling tape thereon, a plurality of heads which record and play back the data on and from said tape, a rotary portion which is rotated about an axis of said stationary drum while carrying said thereon, and a drive portion which drives and rotates said rotary portion;

air injection means for spouting air from vicinities of said heads outward of said rotary portion in order to separate said tape from said heads in a state in which at least part of said tape is wound on said stationary drum; and control means for controlling starting and stopping of the air spouting of said air injection means, said control means causing said air injection means to spout air, when said control means has detected a standby mode in which said drive portion drives and rotates said rotary portion and in which said heads perform neither the recording nor the playback operation, said control means including means for regulating pressure of the air supplied to said air injection means, and means for detecting a playback output value S of each of said heads in said standby mode and for raising the pressure of the air supplied to said air injection means when said output value S is greater than a preset value S0.

7. A recording/playback apparatus as defined in claim 6, wherein said preset value S0 is greater than that noise output N1 of each of said heads which is delivered when said each head is not in contact with said tape.

8. A recording/playback apparatus as defined in claim 6, wherein said preset value S0 is smaller than that noise output N2 of each of said heads which is delivered when said each head slides in contact with that part of said tape on which no information is recorded.

9. A recording/playback apparatus, for recording and playing back data on and from a magnetic tape, comprising:

a stationary drum which includes a cylindrical outer peripheral surface for winding the traveling tape thereon, a plurality of heads which record and play back the data on and from said type, a rotary portion which is rotated about an axis of said stationary drum while carrying said heads thereon, and a drive portion which drives and rotates said rotary portion;

air injection means for spouting air from vicinities of said heads outward of said rotary portion in order to separate said tape from said heads in a state in which at least part of said tape is wound on said stationary drum;

control means for controlling starting and stopping of the air spouting of said air injection means, said control means causing said air injection means to spout air, when said control means has detected a standby mode in which said drive portion drives and rotates said rotary portion and in which said heads perform neither the recording nor the playback operation; and tape tension regulation means for regulating a tension of said tape wound on said stationary drum, in compliance with a command of said control means; said control means detecting a playback output value S of each of said heads in said standby mode and commanding said tape tension regulation means to weaken the tape tension when said output value S is greater than a preset value S0.

10. A recording/playback apparatus as defined in claim 9, wherein said preset value S0 is greater than that noise output N1 of each of said heads which is delivered when said each head is not in contact with said tape.

11. A recording/playback apparatus as defined in claim 9, wherein said preset value S0 is smaller than that noise output N2 of each of said heads which is delivered when said each head slides in contact with that part of said tape on which no information is recorded.

12. A recording/playback apparatus, for recording and playing back data on and from a magnetic tape, comprising:

a stationary drum which includes a cylindrical outer peripheral surface for winding the traveling tape thereof, a plurality of heads which record and play back the data on and from said tape, rotary portion which is rotated about an axis of said stationary drum while carrying said heads thereon, and a drive portion which drives and rotates said rotary portion;

air injection means for spouting air from vicinities of said heads outward of said rotary portion in order to separate said tape from said heads in a state in which at least part of said type is wound on said stationary drum;

control means for controlling starting and stopping of the air spouting of said air injection means, said control means causing said air injection means to spout air, when said control means has detected a standby mode in which said drive portion drives and rotates said rotary portion and in which said heads perform neither the recording nor the playback operation; and a recording circuit for transferring a signal to-be-recorded to said heads so as to record the signal on said tape, in compliance with a command of said control means;

said control means detecting a playback output value S of each of said heads before causing said air injection means to spout air, when said control means has detected said standby mode; and said control means commanding said recording circuit to record a predetermined detection signal on said tape when said output value S is smaller than a preset value S2.

13. A recording/playback apparatus as defined in claim 12, wherein said preset value S2 is smaller than an output value which is delivered when said each head plays back said data of said tape.

14. A recording/playback apparatus as defined in claim 12, further comprising erase means for erasing the signal of said tape in compliance with a command of said control means; and wherein said control means commands said erase means to erase said detection signal, when said control means has detected an end of said standby mode.

15. A recording/playback apparatus for recording and playing back data on and from a magnetic tape, comprising:

a stationary drum which includes a cylindrical outer peripheral surface for winding the traveling tape thereon, a plurality of heads which record and play back the data on and from said tape, a rotary portion which is rotated about an axis of said stationary drum while carrying said heads thereon, a drive portion which drives and rotates said rotary portion, and tape tension regulation means for regulating a tension of said tape wound on said stationary drum; and air injection means for spouting air from vicinities of said heads outward of said rotary portion in order to separate said tape from said heads in a state in which at least part of said tape is wound on said stationary drum, and control means for controlling start and stop of the air spouting of said air injection means and for controlling said tape tension regulation means;

said air injection means including an air circulation passage which is formed with slots in the vicinities of the corresponding heads in order to introduce said air into said vicinities of said corresponding heads, and means for detecting an internal pressure of said air circulation passage;

said control means causing said air injection means to spout said air, when it has detected a standby mode being a status in which said drive portion drives and rotates said rotary portion and in which said heads perform neither the recording nor the playback operation;

said control means commanding said tape tension regulation means to intensify the tape tension, when the detected pressure of the pressure detection means is lower than a preset pressure.

* * * * *